(12) United States Patent
Comfort et al.

(10) Patent No.: US 10,610,960 B2
(45) Date of Patent: Apr. 7, 2020

(54) PIN TOOL ASSEMBLIES FOR FRICTION STIR WELDING AND APPARATUS AND METHODS INCLUDING THE SAME

(71) Applicant: The Boeing Company, Chicago, IL (US)

(72) Inventors: John Michael Comfort, Corona, CA (US); Mark A. Fischer, Lakewood, CA (US); Joseph Andrew Querin, Cullman, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/146,937

(22) Filed: Sep. 28, 2018

(65) Prior Publication Data
US 2019/0030640 A1     Jan. 31, 2019

Related U.S. Application Data

(63) Continuation of application No. 14/606,297, filed on Jan. 27, 2015, now Pat. No. 10,105,791.

(51) Int. Cl.
*B32B 41/00* (2006.01)
*B23K 20/12* (2006.01)

(52) U.S. Cl.
CPC ...... *B23K 20/1255* (2013.01); *B23K 20/1225* (2013.01)

(58) Field of Classification Search
CPC .................. B23K 20/1255; B23K 20/1225
USPC ............................ 156/64, 350, 351, 378, 379
See application file for complete search history.

(56) References Cited

U.S. PATENT DOCUMENTS

| | | | |
|---|---|---|---|
| 5,697,544 | A | 12/1997 | Wykes |
| 5,893,507 | A | 4/1999 | Ding et al. |
| 6,758,382 | B1 | 7/2004 | Carter |
| 7,581,665 | B2 | 9/2009 | Burton et al. |

OTHER PUBLICATIONS

Machine Design, "Causing a Stir in Welding: Friction Stir Welding Joins Previously Unweldable Materials," MachineDesign.com, Mar. 21, 2002.
ESAB, "LEGIO: A modular Friction Stir Welding system," Products. ESAB.com, Aug. 29, 2011.

*Primary Examiner* — Michael N Orlando
*Assistant Examiner* — Joshel Rivera
(74) *Attorney, Agent, or Firm* — Dascenzo Intellectual Property Law, P.C.

(57) ABSTRACT

Pin tool assemblies for friction stir welding and apparatus and methods that include the pin tool assemblies. The pin tool assemblies include an outer member, an inner member, and a stop. The outer member includes an inner surface that defines an elongate internal cavity and an external shoulder that includes an opening to the elongate internal cavity. The inner member includes a welding end, extends at least partially within the elongate internal cavity, and projects from the opening such that the welding end is external the elongate internal cavity. The pin tool assembly is configured to permit motion of the inner member relative to the outer member. The stop defines a plurality of stop configurations. Each of the stop configurations restricts motion of the inner member relative to the outer member in a stop direction to define a corresponding stop distance between the welding end and the external shoulder.

20 Claims, 8 Drawing Sheets

PIN TOOL ASSEMBLIES FOR FRICTION STIR WELDING AND APPARATUS AND METHODS INCLUDING THE SAME

RELATED APPLICATION

This application is a continuation of and claims priority to U.S. patent application Ser. No. 14/606,297, filed on Jan. 27, 2015 and entitled PIN TOOL ASSEMBLIES FOR FRICTION STIR WELDING AND APPARATUS AND METHODS INCLUDING THE SAME, and the complete disclosure of which is incorporated by reference.

FIELD

The present disclosure relates to pin tool assemblies and more particularly to pin tool assemblies for a friction stir welding apparatus, to friction stir welding apparatus that include the pin tool assemblies, and/or to methods of utilizing pin tool assemblies.

BACKGROUND

Friction stir welding (FSW) is a solid-state process for joining two bodies. In FSW, a welding end of a pin tool assembly is rotated, brought into contact with the two bodies at a joint therebetween, and plunged into the two bodies. This generates heat due to friction between the welding end of the pin tool assembly and the two bodies, which softens the two bodies. Rotation of the welding end then causes mixing of the materials that form the two bodies. The pin tool assembly may be translated along the joint, thereby joining, or welding, the two bodies at the joint.

The welding end may be fixed relative to a remainder of the pin tool assembly (but still rotated relative to the two bodies). Under these conditions, friction stir welding of the two bodies leaves a void space, or divot, at the end of a weld therebetween. This may be especially true when the joint is a circumferential joint. Alternatively, the welding end of the pin tool assembly may be configured to retract into the pin tool assembly, thereby controlling and/or regulating a depth of penetration of the welding end into the two bodies during friction stir welding of the two bodies. This permits the pin tool assembly to weld materials of different and/or varying thicknesses (e.g., thicknesses that vary along a length of the joint). Additionally or alternatively, this also permits the welding end to be retracted at the end of a weld between the two bodies, thereby permitting termination of the weld without leaving the void space.

While pin tool assemblies with retractable welding ends may be effective at friction stir welding various bodies together, it may be difficult to accurately control and/or regulate the extent to which the welding end extends from and/or is retracted into the pin tool assembly, especially when the pin tool assembly is subjected to the high applied forces that often are utilized in friction stir welding. Thus, there exists a need for improved pin tool assemblies for friction stir welding and/or for friction stir welding apparatus and/or methods that include the improved pin tool assemblies.

SUMMARY

Pin tool assemblies for friction stir welding and apparatus and methods that include the pin tool assemblies are disclosed herein. The pin tool assemblies include an outer member, an inner member, and a stop. The outer member includes an inner surface that defines an elongate internal cavity. The outer member also includes an external shoulder that includes an opening to the elongate internal cavity. The inner member includes a welding end and extends at least partially within the elongate internal cavity. The inner member projects from the opening such that the welding end is external the elongate internal cavity. The pin tool assembly is configured to permit motion of the inner member relative to the outer member to vary a distance between the welding end and the external shoulder. The stop defines a plurality of stop configurations. Each of the stop configurations restricts motion of the inner member relative to the outer member in a stop direction to define a corresponding stop distance between the welding end and the external shoulder. The restriction of motion occurs within the elongate internal cavity. The methods include methods of operating a friction stir welding apparatus that includes the pin tool assembly.

DESCRIPTION

Figure 1:
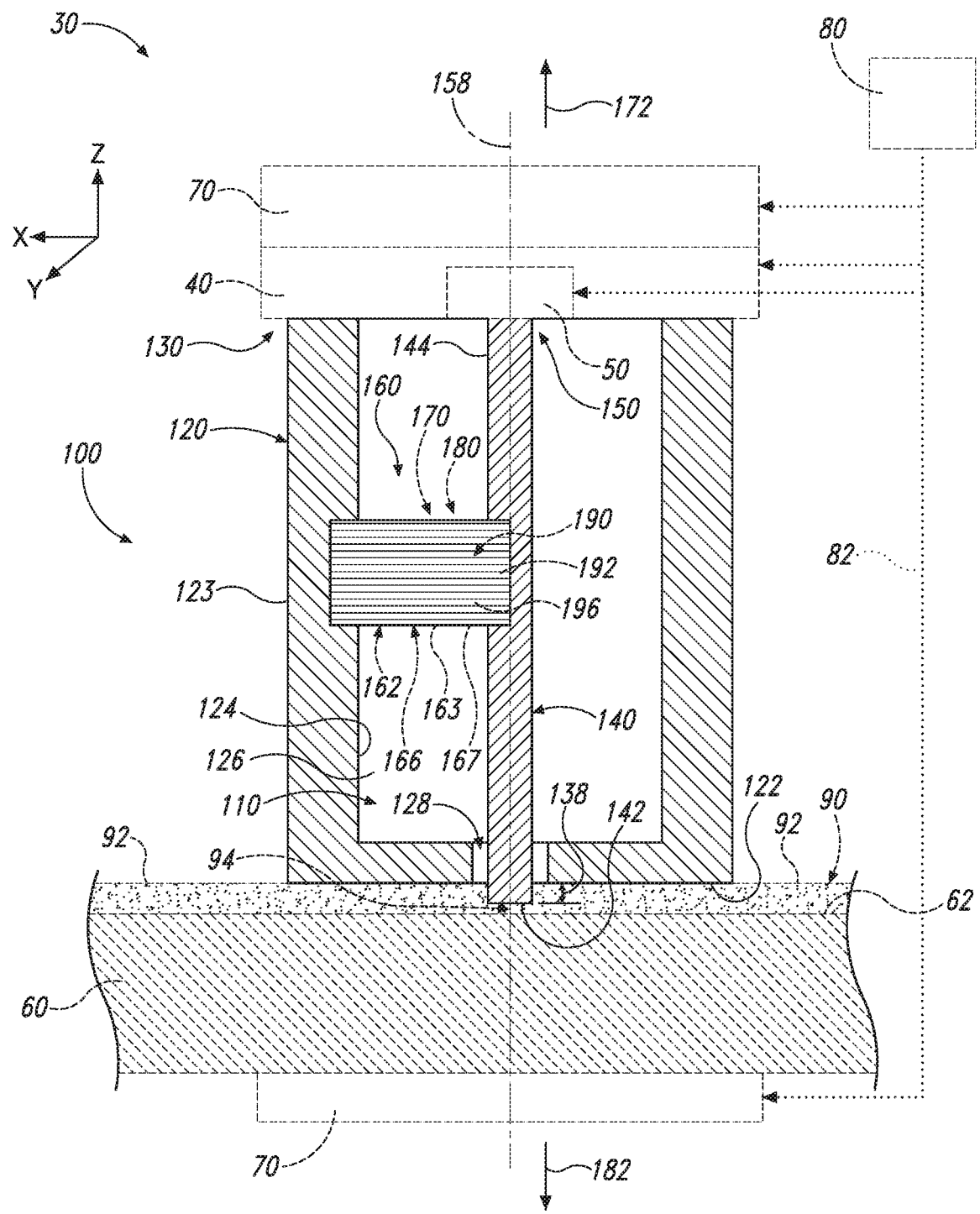
FIG. 1 is schematic representation of examples of a friction stir welding apparatus that includes a pin tool assembly according to the present disclosure.

FIGS. 1-24 provide examples of pin tool assemblies 100 according to the present disclosure, of friction stir welding apparatus 30 that may include and/or utilize pin tool assemblies 100, and/or of methods 200/250 of operating a friction stir welding apparatus. Elements that serve a similar, or at least substantially similar, purpose are labeled with like numbers in each of FIGS. 1-24, and these elements may not be discussed in detail herein with reference to each of FIGS. 1-24. Similarly, all elements may not be labeled in each of FIGS. 1-24, but reference numerals associated therewith may be utilized herein for consistency. Elements, components, and/or features that are discussed herein with reference to one or more of FIGS. 1-24 may be included in and/or utilized with any of FIGS. 1-24 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is schematic representation of examples of a friction stir welding apparatus 30 that includes a pin tool assembly 100 according to the present disclosure. Friction stir welding apparatus 30 also may be referred to herein as an apparatus 30 and may include a drive structure 40, an inner member translation structure 50, an anvil 60, a separation regulating structure 70, and/or a control structure 80. Apparatus 30 may be adapted, configured, designed, and/or constructed to friction stir weld a workpiece 90 that includes two bodies 92 that define a joint 94 therebetween.

During operation of apparatus 30, and as discussed in more detail herein, workpiece 90 may be located on anvil 60 and pin tool assembly 100 may be rotated, such as via drive structure 40. A welding end 142 of pin tool assembly 100 then may be plunged into workpiece 90. Friction generated by relative motion between welding end 142 and workpiece 90 may soften a portion of workpiece 90 that is proximal to welding end 142, and rotation of welding end 142 may mechanically mix and/or combine bodies 92, thereby welding the bodies together. The pin tool assembly may be translated along joint 94, thereby creating a longitudinal weld along joint 94 and/or between bodies 92.

Pin tool assembly 100 includes an outer member 120, and inner member 140, and a stop 160. Outer member 120 includes an inner surface 124 that at least partially defines and/or at least partially bounds an elongate internal cavity 126. In addition, outer member 120 includes and/or defines an external shoulder 122 that may face toward workpiece 90, may be configured to contact workpiece 90 during operation of apparatus 30, and/or may be configured to contact a surface of workpiece 90 that is opposed to anvil 60 during operation of apparatus 30. External shoulder 122 includes an opening 128 to, or that extends into, elongate internal cavity 126.

Inner member 140 includes and/or defines welding end 142 of pin tool assembly 100 and extends at least partially within elongate internal cavity 126. In addition, inner member 140 projects from opening 128 such that welding end 142 is external to elongate internal cavity 126. Pin tool assembly 100 is configured to permit at least limited motion of inner member 140 relative to outer member 120, such as along a longitudinal axis 158 of inner member 140. This motion of inner member 140 relative to outer member 120 may be utilized to vary a distance 138 between welding end 142 and external shoulder 122.

Stop 160 is located at least partially, or even completely, within elongate internal cavity 126 and defines a plurality of stop configurations, which are discussed in more detail herein. Each of the plurality of stop configurations restricts the motion of inner member 140 relative to outer member 120 in a stop direction and defines a corresponding stop distance (i.e., distance 138) between welding end 142 and external shoulder 122. Stop 160 may restrict the motion of inner member 140 relative to outer member 120 within elongate internal cavity 126, such as via operatively interlocking and/or operatively engaging (or operatively engaging with) inner member 140 and outer member 120 within elongate internal cavity 126.

Conventional friction stir welding apparatus may include a conventional pin tool assembly that includes an outer member and an inner member but that does not include and/or utilize stop 160. In such conventional friction stir welding apparatus, control and/or regulation of the motion of the inner member relative to the outer member (i.e., control and/or regulation of the distance between a welding end of the inner member and an external shoulder of the outer member) is accomplished solely by a structure, which may be similar to inner member translation structure 50, that is distal from the welding end of the inner member and/or that is external to an elongate internal cavity that may be defined by the outer member.

As discussed, friction stir welding may include application of large normal forces to a workpiece by the pin tool assembly, and these large normal forces may produce bending and/or deflection of the inner member, of the outer member, and/or of one or more other components of the conventional friction stir welding apparatus, thereby decreasing an accuracy of control and/or regulation of the distance between the welding end of the inner member and the external shoulder of the outer member that may be obtained utilizing the conventional friction stir welding apparatus. While this decreased accuracy still may be sufficient to provide a desired level of control in many friction stir welding applications, it may be insufficient in others. As an example, aerospace applications may require very tight control and/or regulation of the distance between the welding end and the external shoulder, and these tight tolerances may not be achievable utilizing conventional friction stir welding apparatus.

In contrast to conventional pin tool assemblies, pin tool assemblies 100 according to the present disclosure include stop 160. As discussed, stop 160 defines a plurality of stop configurations and also may be referred to herein as an adjustable stop 160. The plurality of stop configurations may include any suitable number of stop configurations. As examples, the plurality of stop configurations may include at least 2, at least 3, at least 4, at least 5, at least 6, at least 8, at least 10, at least 12, at least 14, at least 16, at least 18, or at least 20 different discrete stop configurations, with each of the discrete stop configurations defining a corresponding stop distance (i.e., magnitude of distance 138). As another example, the plurality of stop configurations may include an infinite number of different stop configurations that define an infinite number of corresponding stop distances. Examples of stops 160 that define a plurality of discrete stop configurations are discussed in more detail herein with reference to FIGS. 21-22. Examples of stops 160 that define an infinite (or continuously variable) number of stop configurations are discussed in more detail herein with reference to FIGS. 19-20.

When stop 160 is restricting the motion of inner member 140 relative to outer member 120, the plurality of stop configurations may include and/or define a maximum extension configuration and a minimum extension configuration. In the maximum extension configuration, distance 138 may have a maximum value. In the minimum extension configuration, distance 138 may have a minimum value. A remainder of the plurality of stop configurations may be between the maximum extension configuration and the minimum extension configuration.

Pin tool assembly 100 may be configured such that a difference between the maximum value and the minimum value has any suitable magnitude. As examples, the difference between the maximum value and the minimum value may be at least 0.25 millimeter (mm), at least 0.5 mm, at least 0.75 mm, at least 1 mm, at least 2 mm, at least 3 mm, at least 4 mm, at least 5 mm, at least 7.5 mm, and/or at least 10 mm. Additionally or alternatively, the difference between the maximum value and the minimum value also may be less than 20 mm, less than 15 mm, less than 10 mm, less than 8 mm, less than 6 mm, less than 5 mm, less than 4 mm, less than 3 mm, less than 2 mm, and/or less than 1 mm.

It is within the scope of the present disclosure that the stop direction may include any suitable direction along longitudinal axis 158. As an example, the stop direction may include and/or be a retraction direction 172. Thus, stop 160 may limit and/or restrict retraction of inner member 140 into outer member 120 (or into elongate internal cavity 126 and/or into opening 128 thereof) and/or may limit and/or restrict motion of welding end 142 toward external shoulder 122, and/or may regulate a minimum distance between welding end 142 and external shoulder 122. Under these conditions, stop 160 also may be referred to herein as a retraction stop 170 and/or may define a plurality of different minimum distances between welding end 142 and external shoulder 122. More specific examples of retraction stops 170 that may be included in and/or utilized with pin tool assembly 100 of FIG. 1 are discussed in more detail herein with reference to FIGS. 2-5 and 1-18.

As another example, the stop direction may include and/or be an extension direction 182. Thus, stop 160 may limit and/or restrict extension of inner member 140 from outer member 120 (or from elongate internal cavity 126 and/or from opening 128 thereof) and/or may limit and/or restrict motion of welding end 142 away from external shoulder 122, and/or may regulate a maximum distance between welding end 142 and external shoulder 122. Under these conditions, stop 160 also may be referred to herein as an extension stop 180 and/or may define a plurality of different maximum distances between welding end 142 and external shoulder 122. More specific examples of extension stops 180 that may be included in and/or utilized with pin tool assembly 100 of FIG. 1 are discussed in more detail herein with reference to FIGS. 6-18.

As yet another example, stop 160 may limit motion of inner member 140 relative to outer member 120 in both retraction direction 172 and extension direction 182. Under these conditions, stop 160 may be referred to herein as both retraction stop 170 and extension stop 180 (or pin tool assembly 100 may be referred to herein as including both retraction stop 170 and extension stop 180). More specific examples of pin tool assemblies 100 that include both retraction stop 170 and extension stop 180 are discussed in more detail herein with reference to FIGS. 10-18.

In FIG. 1, stop 160 is shown in an overlapping relationship with both outer member 120 and inner member 140 to illustrate that stop 160 may be at least partially formed by both outer member 120 and inner member 140. As an example, stop 160 may include an outer stop structure 162 and an inner stop structure 166. Outer stop structure 162 may be defined by outer member 120, may be defined by inner surface 124 of outer member 120, and/or may be defined by a portion of outer member 120 that defines at least a portion of elongate internal cavity 126. Inner stop structure 166 may be defined by inner member 140, may be defined by an external surface 144 of inner member 140, and/or may be defined by a portion of inner member 140 that extends within elongate internal cavity 126. More specific examples of outer stop structure 162 and inner stop structure 166 that may be included in and/or utilized with pin tool assemblies 100 of FIG. 1 are discussed in more detail herein with reference to FIGS. 2-22.

Stop 160 further may include an adjustment mechanism 190. Adjustment mechanism 190 may be configured to be selectively moved, actuated, and/or adjusted to transition stop 160 among the plurality of stop configurations. More specific examples of adjustment mechanisms 190 that may be included in and/or utilized with stop 160 of FIG. 1 are illustrated in FIGS. 2-22 and discussed in more detail herein with reference thereto.

Inner stop structure 166 may include and/or be an inner flange 167 that may be defined by inner member 140. As perhaps illustrated more clearly in FIGS. 2-13, inner flange 167 may extend radially from external surface 144 of inner member 140. It is within the scope of the present disclosure that inner flange 167 may be integral to, formed with, and/or monolithic with inner member 140. Alternatively, it is also within the scope of the present disclosure that inner flange 167 may be operatively attached to inner member 140.

Inner flange 167 may extend perpendicular to longitudinal axis 158 of inner member 140. Inner flange 167 may include and/or define a welding end-proximal surface 168 that may be at least substantially perpendicular to longitudinal axis 158 and/or that may face toward welding end 142. This is illustrated in FIGS. 2 and 4-13. Inner flange 167 additionally or alternatively may include and/or define a welding end-distal surface 169 that may be at least substantially perpendicular to longitudinal axis 158 and/or that may face away from welding end 142. This is illustrated in FIGS. 2-6 and 8-13.

Figure 2:
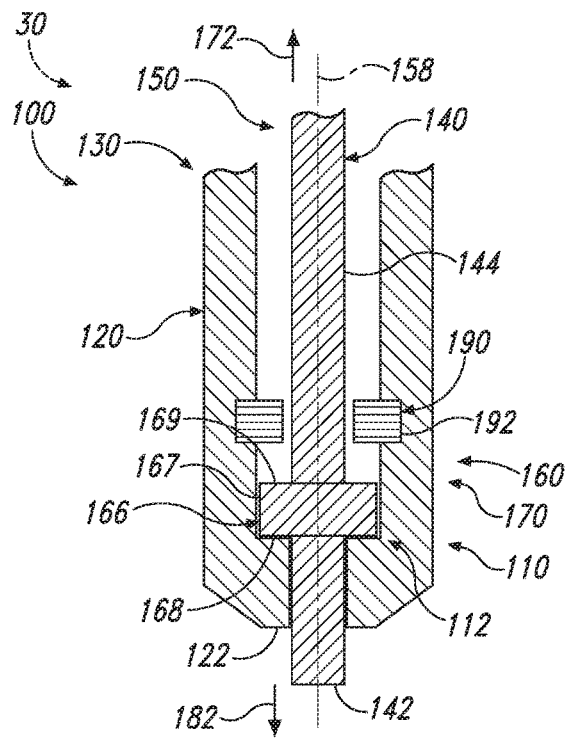
FIG. 2 is a schematic cross-sectional view of a pin tool assembly, according to the present disclosure, that includes a retraction stop that defines a plurality of stop configurations.
Figure 3:
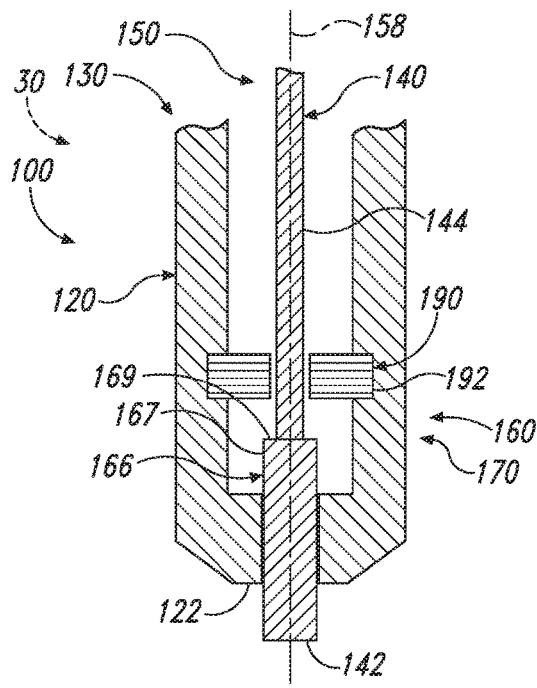
FIG. 3 is a schematic cross-sectional view of a pin tool assembly, according to the present disclosure, that includes a retraction stop that defines a plurality of stop configurations.
Figure 5:
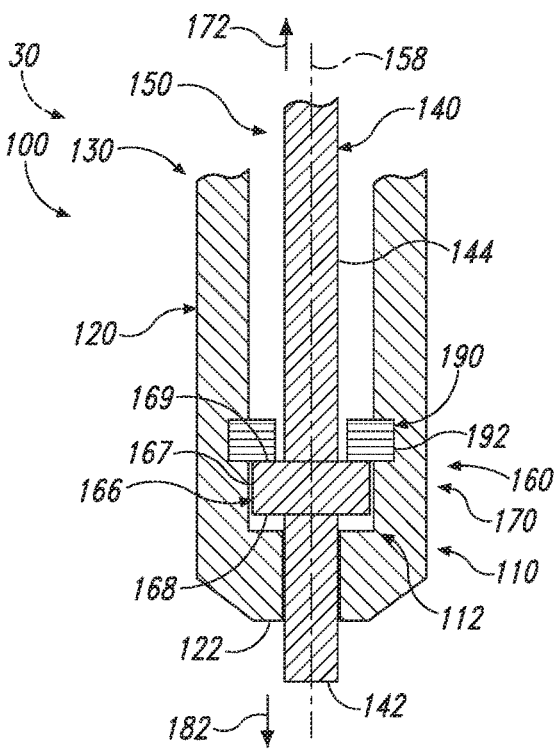
FIG. 5 is a schematic cross-sectional view of a pin tool assembly, according to the present disclosure, that includes a retraction stop that defines a plurality of stop configurations.
Figure 6:
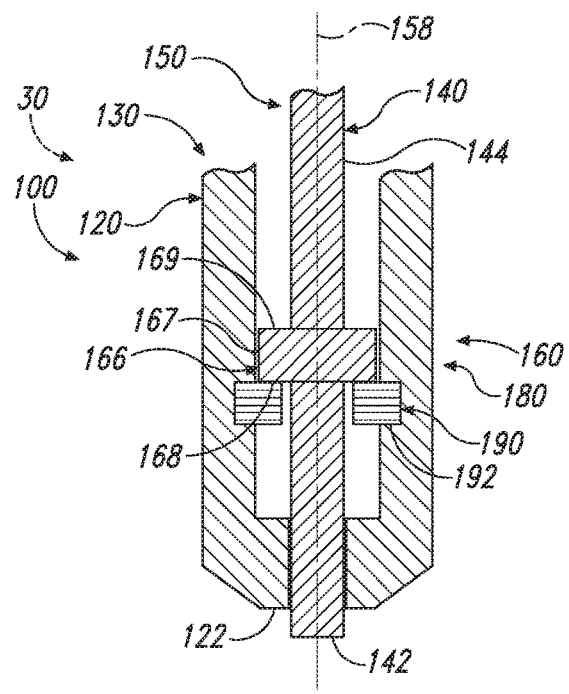
FIG. 6 is a schematic cross-sectional view of a pin tool assembly, according to the present disclosure, that includes an extension stop that defines a plurality of stop configurations.
Figure 7:
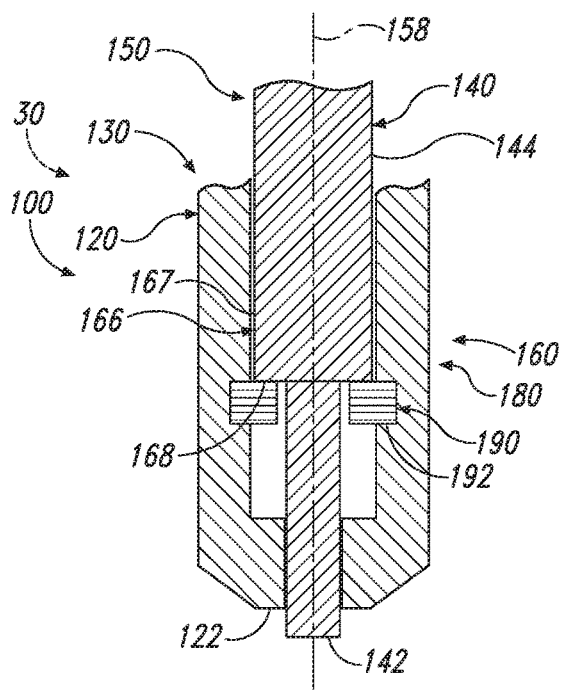
FIG. 7 is a schematic cross-sectional view of a pin tool assembly, according to the present disclosure, that includes an extension stop that defines a plurality of stop configurations.

Inner flange 167 may extend from welding end-proximal surface 168 to a drive end 150 of inner member 140, as illustrated in FIG. 7. Drive end 150 may be at least substantially opposed to welding end 142. Alternatively, inner flange 167 may extend from welding end-distal surface 169 to welding end 142, as illustrated in FIG. 3. Alternatively, inner flange 167 may extend between welding end-proximal surface 168 and welding end-distal surface 169, as illustrated in FIGS. 2, 4-6, and 8-13.

When inner stop structure 166 includes inner flange 167, adjustment mechanism 190 may include and/or be an outer adjustment mechanism 192 that may be operatively attached to outer member 120. When stop 160 is retraction stop 170, and as illustrated in more detail in FIGS. 2-5 and 10-13, outer adjustment mechanism 192 may be configured to operatively contact welding end-distal surface 169 of inner flange 167 to restrict motion of inner member 140 within elongate internal cavity 126 in retraction direction 172 (as illustrated in FIG. 1). Under these conditions, outer adjustment mechanism 192 may be located between welding end-distal surface 169 and drive end 150 of inner member 140.

When stop 160 is extension stop 180, and as illustrated in more detail in FIGS. 6-13, outer adjustment mechanism 192 may be configured to operatively contact welding end-proximal surface 168 of inner flange 167 to restrict motion of inner member 140 within elongate internal cavity 126 in extension direction 182 (as illustrated in FIG. 1). Under these conditions, outer adjustment mechanism 192 may be located between welding end-proximal surface 168 and welding end 142 of inner member 140.

Outer stop structure 162 alternatively may include and/or be one or more outer flanges 163 that may be defined by outer member 120. As perhaps illustrated more clearly in FIGS. 14-18, outer flange 163 may extend radially from inner surface 124 of outer member 120. It is within the scope of the present disclosure that outer flange 163 may be integral to, formed with, and/or monolithic with outer member 120. Alternatively, it is also within the scope of the present disclosure that outer flange 163 may be operatively attached to outer member 120.

Outer flange 163 may extend perpendicular to longitudinal axis 158 of inner member 140. Outer flange 163 may include and/or define a shoulder-opposed surface 164 and/or a shoulder-facing surface 165. Shoulder-opposed surface 164 may be at least substantially perpendicular to longitudinal axis 158 and/or may face away from external shoulder 122. Shoulder-facing surface 165 may be at least substantially perpendicular to longitudinal axis 158 and/or may face toward external shoulder 122. This is illustrated in FIGS. 14-18.

Outer flange 163 may extend from shoulder-opposed surface 164 to external shoulder 122, as illustrated in FIGS. 14-17. Additionally or alternatively, outer flange 163 (or another outer flange 163) may extend from shoulder-facing surface 165 to a drive end 130 of outer member 120, as also illustrated in FIGS. 14-17. Drive end 130 may be opposed to external shoulder 122. Alternatively, outer flange 163 may extend between shoulder-opposed surface 164 and shoulder-facing surface 165, as illustrated in FIG. 18.

When outer stop structure 162 includes outer flange 163, adjustment mechanism 190 may include and/or be an inner adjustment mechanism 196 that may be operatively attached to inner member 140. When stop 160 is retraction stop 170, and as illustrated in more detail in FIGS. 14-18, inner adjustment mechanism 196 may be configured to operatively contact shoulder-facing surface 165 to restrict motion of inner member 140 within elongate internal cavity 126 in retraction direction 172 (as illustrated in FIG. 1). Under these conditions, inner adjustment mechanism 196 may be located between shoulder-facing surface 165 and external shoulder 122. When stop 160 is extension stop 180, and as illustrated in more detail in FIGS. 14-18, inner adjustment mechanism 196 may be configured to operatively contact shoulder-opposed surface 164 to restrict motion of inner member 140 within elongate internal cavity 126 in extension direction 182 (as illustrated in FIG. 1). Under these conditions, inner adjustment mechanism 196 may be located between shoulder-opposed surface 164 and drive end 130.

Figure 4:
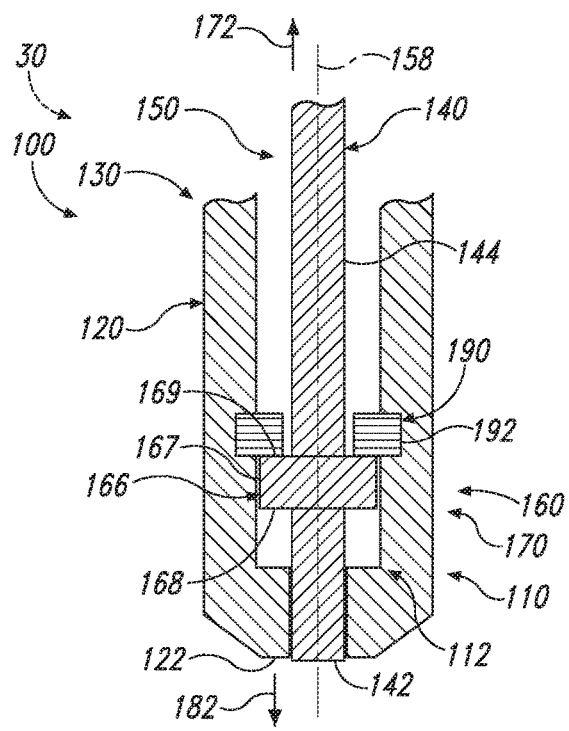
FIG. 4 is a schematic cross-sectional view of a pin tool assembly, according to the present disclosure, that includes a retraction stop that defines a plurality of stop configurations.

Pin tool assembly 100 also may include a fixed stop 110. Fixed stop 110 may not be adjustable and/or may not be configured to define a plurality of stop configurations. Examples of fixed stop 110 are illustrated in more detail in FIGS. 2 and 4-5. Therein, operative engagement between inner flange 167 and outer member 120 functions as a fixed extension stop 112 for inner member 140. In FIGS. 2 and 4-5, stop 160 may be referred to herein as restricting motion of inner member 140 relative to outer member 120 in a first stop direction (i.e., retraction direction 172) and fixed stop 110 may be referred to herein as restriction motion of inner member 140 relative to outer member 120 in a second stop direction (i.e., extension direction 182). The second stop direction may be opposed to the first stop direction.

While FIGS. 2 and 4-5 illustrate fixed stop 110 in the form of fixed extension stop 112, it is within the scope of the present disclosure that fixed stop 110 also may include and/or be a fixed retraction stop. Under these conditions, the first stop direction may be extension direction 182, and the second stop direction may be retraction direction 172.

With reference to FIGS. 1-22, outer member 120 may include any suitable structure that may define inner surface 124, may define elongate internal cavity 126, may include external shoulder 122, may include opening 128, and/or that may be configured to support compressive forces that may be applied thereto during operation of friction stir welding apparatus 30. As examples, outer member 120 may include and/or be a metallic outer member, a tubular outer member, an at least substantially tubular outer member, a hollow cylindrical outer member, and/or an at least substantially hollow cylindrical outer member. With this in mind, elongate internal cavity 126 may include and/or be a cylindrical, or at least substantially cylindrical, internal cavity. Additionally or alternatively, an external surface 123 of outer member 120 may be cylindrical, or at least substantially cylindrical.

External shoulder 122 may include and/or define any suitable shape. As an example, external shoulder 122 may be a planar external shoulder. As another example, external shoulder 122 may be a smooth external shoulder. As yet another example, external shoulder 122 may include grooves and/or may be a grooved external shoulder.

Inner member 140 may include and/or be any suitable structure that may extend at least partially within elongate internal cavity 126, that may include welding end 142, that may project from opening 128, that may be configured to move relative to outer member 120 to vary distance 138 between welding end 142 and external shoulder 122 (as illustrated in FIG. 1), and/or that may be configured to support compressive forces that may be applied thereto during operation of friction stir welding apparatus 30. As examples, inner member 140 may include and/or be a metallic inner member, a cylindrical inner member, and/or an at least substantially cylindrical inner member.

As discussed, a portion of inner member 140 may project from elongate internal cavity 126 and/or from opening 128 such that welding end 142 is external to elongate internal cavity 126. This portion of inner member 140 may be perpendicular, or at least substantially perpendicular, to external shoulder 122.

Welding end 142 may include and/or define any suitable shape. As an example, welding end 142 may be a planar welding end. As another example, welding end 142 may be a smooth welding end. As yet another example, welding end 142 may include grooves and/or may be a grooved welding end.

Drive structure 40 may include and/or be any suitable structure that may, or may be utilized to, rotate any suitable portion of pin tool assembly 100, such as outer member 120 and/or inner member 140. This may include rotation of pin tool assembly 100 about longitudinal axis 158 of inner member 140. Examples of drive structure 40 include any suitable motor, electric motor, pneumatic motor, and/or hydraulic motor.

As discussed in more detail herein, inner member 140 may be configured to selectively translate relative to outer member 120, such as to selectively vary the distance between welding end 142 and external shoulder 122. This selective translation may be accomplished by inner member translation structure 50. Inner member translation structure 50 may include and/or be any suitable structure that may, or may be utilized to, selectively translate inner member 140 relative to outer member 120, such as to vary the distance between welding end 142 and external shoulder 122. This may include translation of inner member 140 along longitudinal axis 158 and/or translation of inner member 140 within elongate internal cavity 126. Examples of inner member translation structure 50 include any suitable motor, electric motor, pneumatic motor, hydraulic motor, linear motor, linear actuator, rack and pinion assembly, and/or lead screw and nut assembly.

Anvil 60 may be configured to support workpiece 90 during friction stir welding of workpiece 90. This may include supporting workpiece 90 on an anvil surface 62 that may face toward welding end 142 and/or that may be defined by anvil 60. The friction stir welding may include the application of significant normal forces to workpiece 90 by pin tool assembly 100, and anvil 60 may be configured to support workpiece 90 in a fixed, or at least substantially fixed, orientation relative to pin tool assembly 100 despite these normal forces. Thus, anvil 60 may include and/or be a rigid, or at least substantially rigid, anvil 60 and/or a fixed, or at least substantially fixed, anvil 60. Anvil 60 may include and/or be formed from any suitable anvil material, such as a metal.

Separation regulating structure 70 may include and/or be any suitable structure that may be adapted, configured, designed, and/or constructed to control and/or regulate a distance between anvil surface 62 and external shoulder 122 and/or that may be adapted, configured, designed, and/or constructed to operatively translate anvil 60 (or workpiece 90, when present) and pin tool assembly 100 relative to one another. FIG. 1 illustrates two separation regulating structures 70, one that is associated with drive structure 40, inner member translation structure 50, and/or pin tool assembly 100 and one that is associated with anvil 60. Apparatus 30 may include either, or both, separation regulating structures 70 in any suitable configuration and/or combination. As an example, a first separation regulating structure 70 may be configured to regulate the distance between anvil surface 62 and external shoulder 122 (i.e., to move anvil surface 62 and/or external shoulder 122 in the Z-direction of FIG. 1). As another example, a second separation regulating structure 70 may be configured to operatively translate anvil 60 and pin tool assembly 100 relative to one another in the X-Y plane of FIG. 1. As yet another example, a single separation regulating structure 70 may control relative motion between external shoulder 122 and anvil 60 in the X, Y, and Z-directions. Examples of separation regulating structure 70 include any suitable motor, electric motor, pneumatic motor, hydraulic motor, linear motor, linear actuator, rack and pinion assembly, lead screw and nut assembly, and/or X-Y table.

Control structure 80 may include any suitable structure that may be adapted, configured, designed, constructed, and/or programmed to control the operation of at least a portion of apparatus 30. This may include control of drive structure 40, inner member translation structure 50, and/or separation regulating structure 70. As illustrated in dotted lines in FIG. 1, control structure 80 may include one or more communication linkages 82 that may provide communication between control structure 80 and drive structure 40, inner member translation structure 50, separation regulating structure 70, and/or any other suitable portion of friction stir welding apparatus 30.

Examples of control structure 80 include an electronic controller, a dedicated controller, a special-purpose controller, a computer, a personal computer, a display device, a logic device, and/or a memory device. Control structure 80 also may be referred to herein as controller 80 and may be programmed to perform one or more algorithms to automatically control the operation of at least a portion of apparatus 30. This may include algorithms that may be based upon and/or that may cause control structure 80 to direct apparatus 30 to perform any suitable portion of methods 200/250, which are discussed in more detail herein.

FIGS. 2-5 are schematic cross-sectional views of pin tool assemblies 100, according to the present disclosure, that include a stop 160 in the form of a retraction stop 170 that defines a plurality of stop configurations. In FIGS. 2-5, inner stop structure 166 includes inner flange 167. In FIG. 2, inner flange 167 is operatively engaged with outer member 120, with outer member 120 functioning as fixed extension stop 112. Conversely, and as illustrated in FIG. 4, inner flange 167 is operatively engaged with outer adjustment mechanism 192, with outer adjustment mechanism 192 restricting retraction of inner member 140 and thereby functioning as retraction stop 170. As illustrated in FIG. 5, outer adjustment mechanism 192 may be selectively moved to change a location of retraction stop 170, thereby changing (increasing) a minimum distance between welding end 142 and external shoulder 122 that may be obtained prior to operative engagement between inner flange 167 and outer adjustment mechanism 192. FIG. 3 illustrates an alternative shape for inner flange 167.

Figure 8:
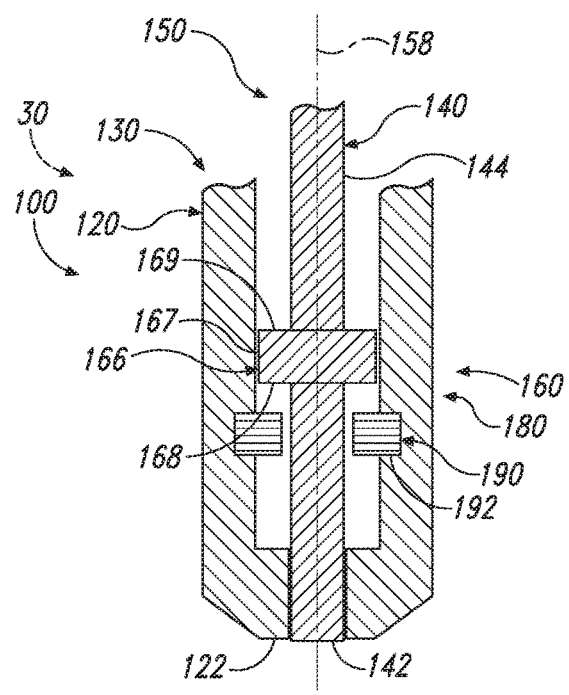
FIG. 8 is a schematic cross-sectional view of a pin tool assembly, according to the present disclosure, that includes an extension stop that defines a plurality of stop configurations.
Figure 9:
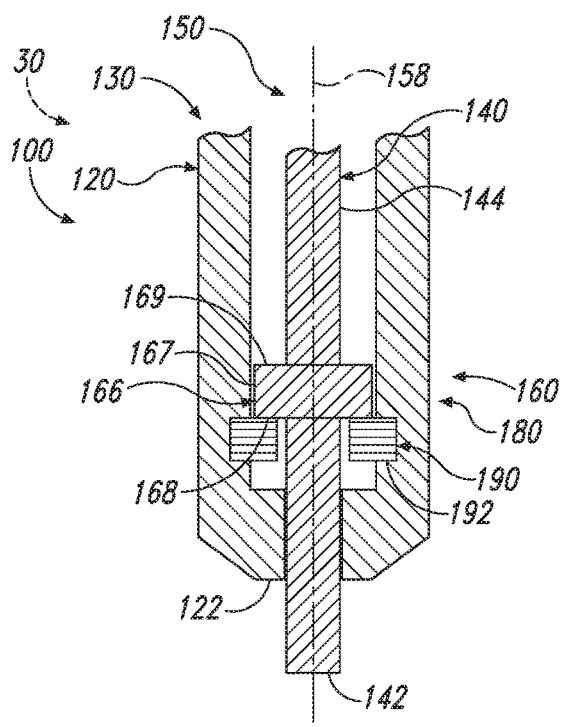
FIG. 9 is a schematic cross-sectional view of a pin tool assembly, according to the present disclosure, that includes an extension stop that defines a plurality of stop configurations.

FIGS. 6-9 are schematic cross-sectional views of pin tool assemblies 100, according to the present disclosure, that include a stop 160 in the form of an extension stop 180 that defines a plurality of stop configurations. In FIGS. 6-9, inner stop structure 166 includes inner flange 167. In FIG. 6, inner flange 167 is operatively engaged with outer adjustment mechanism 192, with outer adjustment mechanism 192 restricting extension of extension of inner member 140 and thereby functioning as extension stop 180. In FIG. 8, inner member 140 has been retracted from the configuration of FIG. 6, thereby separating inner flange 167 from outer adjustment mechanism 192. In FIG. 9, outer adjustment mechanism 192 has been selectively moved to change a location of extension stop 180, thereby changing (increasing) a maximum distance between welding end 142 and external shoulder 122 that may be obtained prior to operative engagement between inner flange 167 and outer adjustment mechanism 192. FIG. 7 illustrates an alternative shape for inner flange 167.

FIGS. 10-18 are schematic cross-sectional views of pin tool assemblies 100, according to the present disclosure, that include two stops 160 in the form of a retraction stop 170 and an extension stop 180. Retraction stop 170 defines a plurality of retraction stop configurations, and an extension stop 180 defines a plurality of extension stop configurations.

Figure 10:
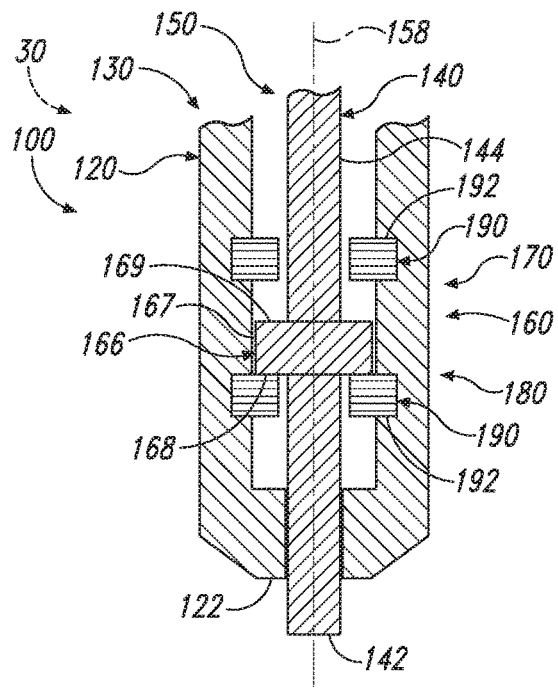
FIG. 10 is a schematic cross-sectional view of a pin tool assembly, according to the present disclosure, that includes an extension stop and a retraction stop that both define a respective plurality of stop configurations.
Figure 11:
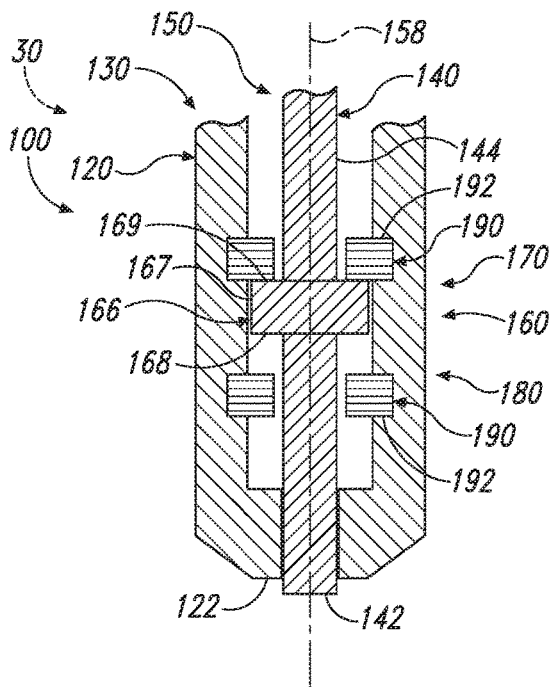
FIG. 11 is a schematic cross-sectional view of a pin tool assembly, according to the present disclosure, that includes an extension stop and a retraction stop that both define a respective plurality of stop configurations.
Figure 12:
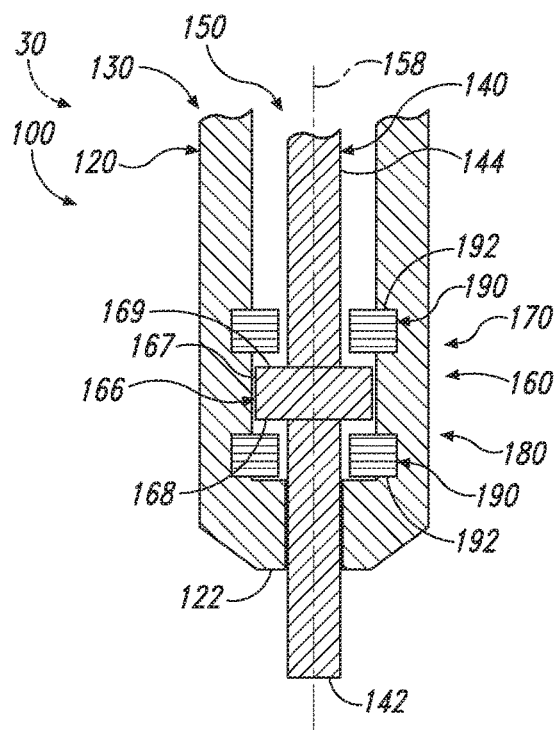
FIG. 12 is a schematic cross-sectional view of a pin tool assembly, according to the present disclosure, that includes an extension stop and a retraction stop that both define a respective plurality of stop configurations.

In FIGS. 10-13, inner stop structure 166 of pin tool assembly 100 includes an inner flange 167. In FIG. 10, a single inner flange 167 is operatively engaged with an outer adjustment mechanism 192 of extension stop 180, thereby defining a maximum distance between welding end 142 and external shoulder 122 for the illustrated configuration of outer adjustment mechanism 192 of extension stop 180. In FIG. 11, the single inner flange 167 is operatively engaged with an outer adjustment mechanism 192 of retraction stop 170, thereby defining a minimum distance between welding end 142 and external shoulder 122 for the illustrated configuration of outer adjustment mechanism 192 of retraction stop 170. In FIG. 12, outer adjustment mechanisms 192 of extension stop 180 and retraction stop 170 have been selectively moved, thereby defining different minimum and maximum distances between welding end 142 and external shoulder 122.

Figure 13:
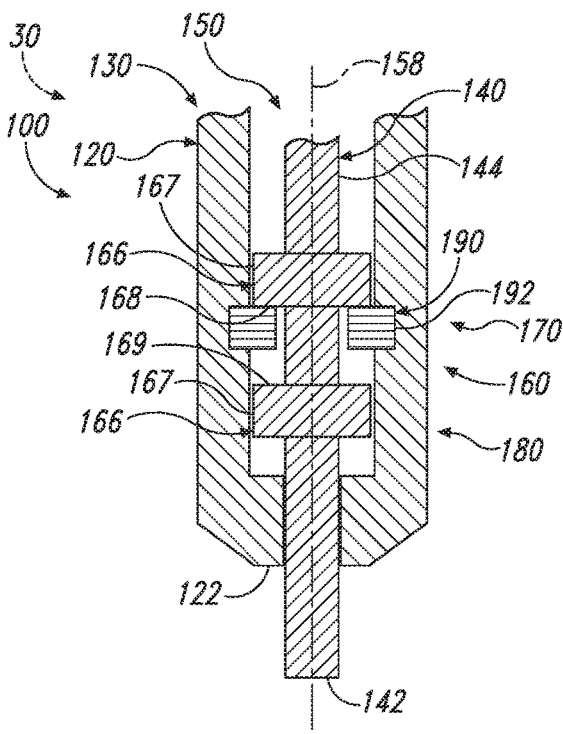
FIG. 13 is a schematic cross-sectional view of a pin tool assembly, according to the present disclosure, that includes an extension stop and a retraction stop that both define a respective plurality of stop configurations.

FIG. 13 illustrates an alternative form of pin tool assembly 100 in which inner member 140 includes two inner stop structures 166 in the form of two inner flanges 167. In FIG. 13, a single outer adjustment mechanism 192 is located between the two inner flanges 167, and selective movement of the single outer adjustment mechanism 192 changes both the maximum and minimum distances between welding end 142 and external shoulder 122.

Figure 14:
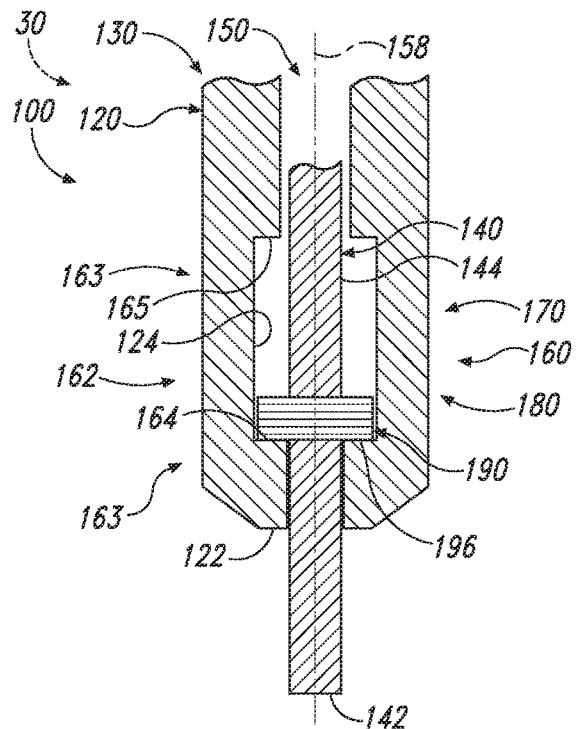
FIG. 14 is a schematic cross-sectional view of a pin tool assembly, according to the present disclosure, that includes an extension stop and a retraction stop that both define a respective plurality of stop configurations.
Figure 15:
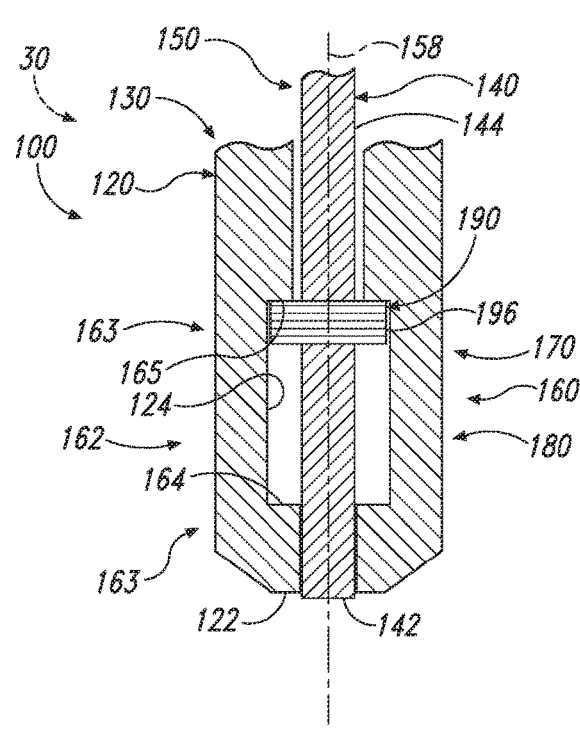
FIG. 15 is a schematic cross-sectional view of a pin tool assembly, according to the present disclosure, that includes an extension stop and a retraction stop that both define a respective plurality of stop configurations.
Figure 16:
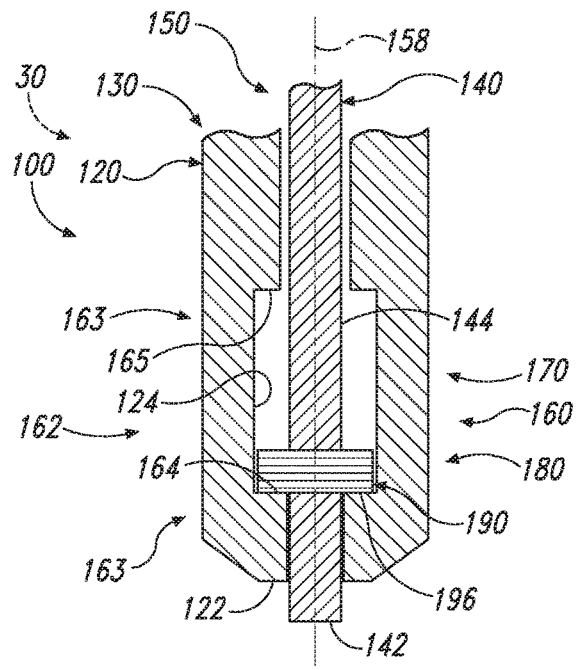
FIG. 16 is a schematic cross-sectional view of a pin tool assembly, according to the present disclosure, that includes an extension stop and a retraction stop that both define a respective plurality of stop configurations.

In FIGS. 14-18, outer stop structure 162 of pin tool assembly 100 includes one or more outer flanges 163. In FIG. 14, a first outer flange 163, which defines a shoulder-opposed surface 164, is operatively engaged with an inner adjustment mechanism 196, thereby defining a maximum distance between welding end 142 and external shoulder 122 for the illustrated configuration of inner adjustment mecha-nism 196. In FIG. 15, a second outer flange 163, which defines a shoulder-facing surface 165, is operatively engaged with inner adjustment mechanism 196, thereby defining a minimum distance between welding end 142 and external shoulder 122 for the illustrated configuration of inner adjustment mechanism 196. In FIG. 16, inner adjustment mechanism 196 has been selectively moved, thereby defining different minimum and maximum distances between welding end 142 and external shoulder 122.

Figure 17:
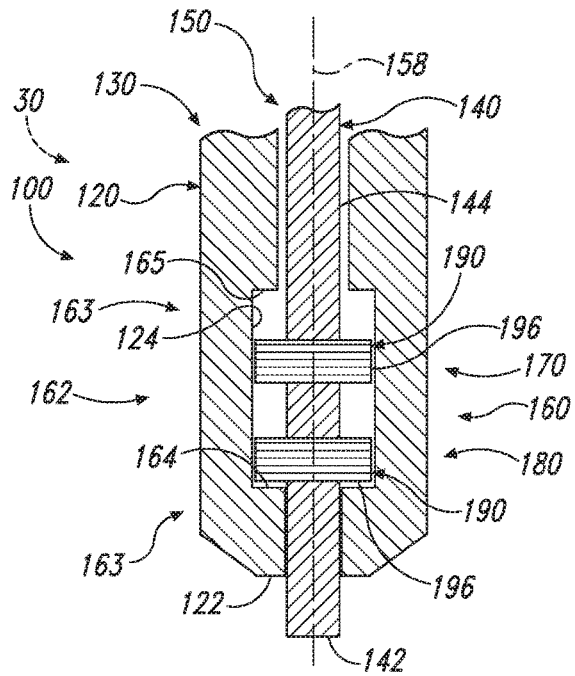
FIG. 17 is a schematic cross-sectional view of a pin tool assembly, according to the present disclosure, that includes an extension stop and a retraction stop that both define a respective plurality of stop configurations.
Figure 18:
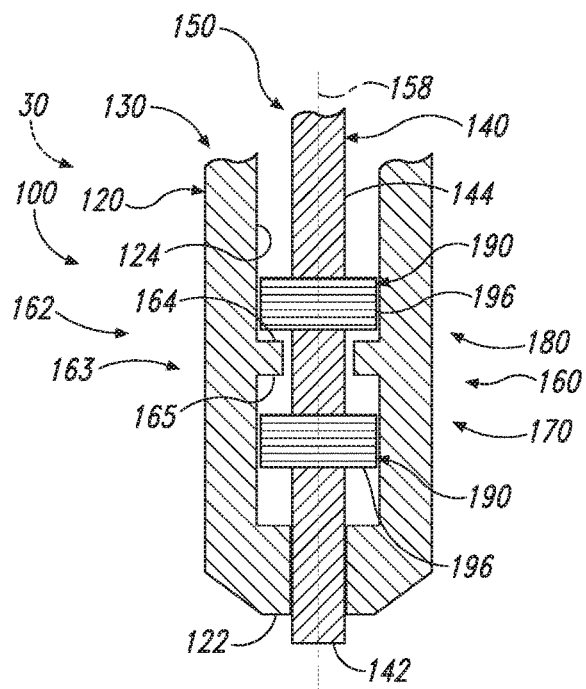
FIG. 18 is a schematic cross-sectional view of a pin tool assembly, according to the present disclosure, that includes an extension stop and a retraction stop that both define a respective plurality of stop configurations.

FIG. 17 illustrates an alternative embodiment of pin tool assembly 100 that includes two inner adjustment mechanisms 196, with a first inner adjustment mechanism 196 being configured to operatively engage shoulder-facing surface 165 and forming a portion of retraction stop 170 and a second inner adjustment mechanism 196 being configured to operatively engage shoulder-opposed surface 164 and forming a portion of extension stop 180. In FIG. 17, the two inner adjustment mechanisms 196 may be configured for independent adjustment along a length of inner member 40, thereby permitting independent adjustment of the minimum and maximum distances between welding end 142 and external shoulder 122.

FIG. 18 illustrates another alternative form of pin tool assembly 100. In FIG. 18, a single outer flange 163 extends from outer member 120 and between a first inner adjustment mechanism 196 and a second inner adjustment mechanism 196. The first inner adjustment mechanism 196 is configured to contact shoulder-opposed side 164 of outer flange 163, thereby functioning as extension stop 180 and defining a maximum distance between welding end 142 and external shoulder 122. The second inner adjustment mechanism 196 is configured to contact shoulder-facing side 165 of outer flange 163, thereby functioning as retraction stop 180 and defining a minimum distance between welding end 142 and external shoulder 122. Similar to FIG. 17, the two inner adjustment mechanisms 196 may be configured for independent adjustment along the length of inner member 40, thereby permitting independent adjustment of the minimum and maximum distances between welding end 142 and external shoulder 122.

FIGS. 19-22 provide more specific examples of adjustment mechanisms 190 that may be included in and/or utilized with pin tool assemblies 100 according to the present disclosure. Adjustment mechanisms 190 may form a portion of any suitable stop 160, including any suitable retraction stop 170 and/or extension stop 180. It is within the scope of the present disclosure that any of the structures, components, and/or features of adjustment mechanisms 190 of any of FIGS. 19-22 may be included in and/or utilized with any suitable pin tool assemblies 100 of FIGS. 1-18. Similarly, any of the structures, components, and/or features of pin tool assemblies 100 of FIGS. 1-18 may be included in and/or utilized with adjustment mechanisms 190 of any of FIGS. 19-22 without departing from the scope of the present disclosure.

Figure 19:
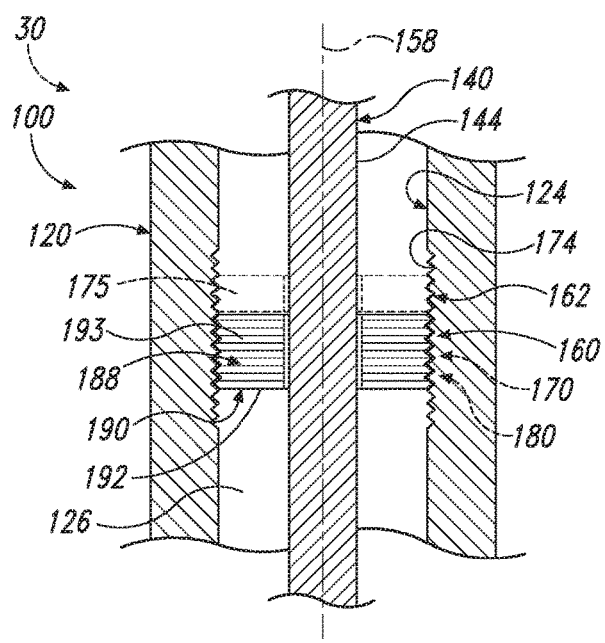
FIG. 19 is a schematic cross-sectional view of a portion of a pin tool assembly, according to the present disclosure, that includes an outer adjustment mechanism in the form of an outer threaded bushing.
Figure 20:
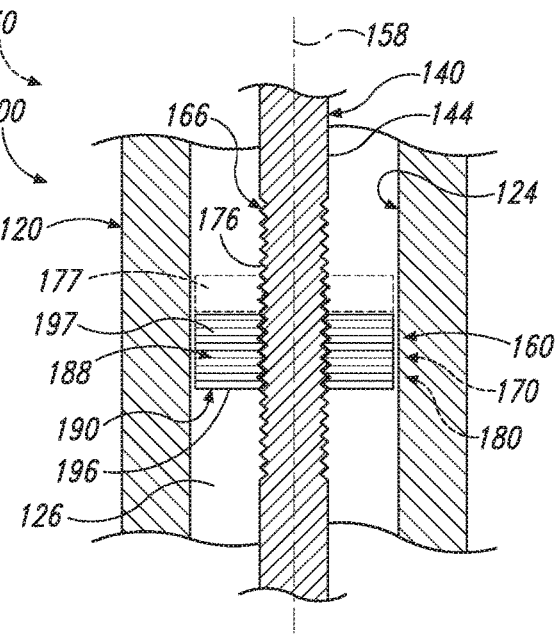
FIG. 20 is a schematic cross-sectional view of a portion of a pin tool assembly, according to the present disclosure, that includes an inner adjustment mechanism in the form of an inner threaded bushing.

FIGS. 19-20 illustrate adjustment mechanism 190 in the form of a threaded bushing 188. Threaded bushing 188 may be configured to be selectively rotated to change a location of adjustment mechanism 190 and thereby to change the configuration of stop 160. Thus, and when stop 160 includes threaded bushing 188, stop 160 may be referred to herein as defining a continuous and/or infinite number of stop configurations.

In FIG. 19, threaded bushing 188 is an outer threaded bushing 193 that defines an outer adjustment mechanism 192, and outer stop structure 162 includes an outer threaded region 174 that extends along inner surface 124 of outer member 120. Under these conditions, outer threaded bushing 193 may be configured to be threaded into outer threaded region 174 via rotation of outer threaded bushing 193 relative to outer member 120. As illustrated, outer threaded region 174 may extend along a longitudinal axis 158 of inner member 140 and/or of elongate internal cavity 126, and stop 160 may be configured to be transitioned among the plurality of stop configurations via rotation of outer threaded bushing 193 relative to outer member 120. As also illustrated in FIG. 19, an outer locking structure 175, such as an outer lock nut, may be configured to lock outer threaded bushing 193 at a desired location within outer threaded region 174.

In FIG. 20, threaded bushing 188 is an inner threaded bushing 197 that defines an inner adjustment mechanism 196, and inner stop structure 166 includes an inner threaded region 176 that extends along an external surface 144 of inner member 140. Under these conditions, inner threaded bushing 197 may be configured to be threaded into inner threaded region 176 via rotation of inner threaded bushing 197 relative to inner member 140. As illustrated, inner threaded region 176 may extend along longitudinal axis 158 of inner member 140 and/or of elongate internal cavity 126, and stop 160 may be configured to be transitioned among the plurality of stop configurations via rotation of inner threaded bushing 197 relative to inner member 140. As also illustrated in FIG. 20, an inner locking structure 177, such as an inner lock nut, may be configured to lock inner threaded bushing 197 at a desired location within inner threaded region 176.

Figure 21:
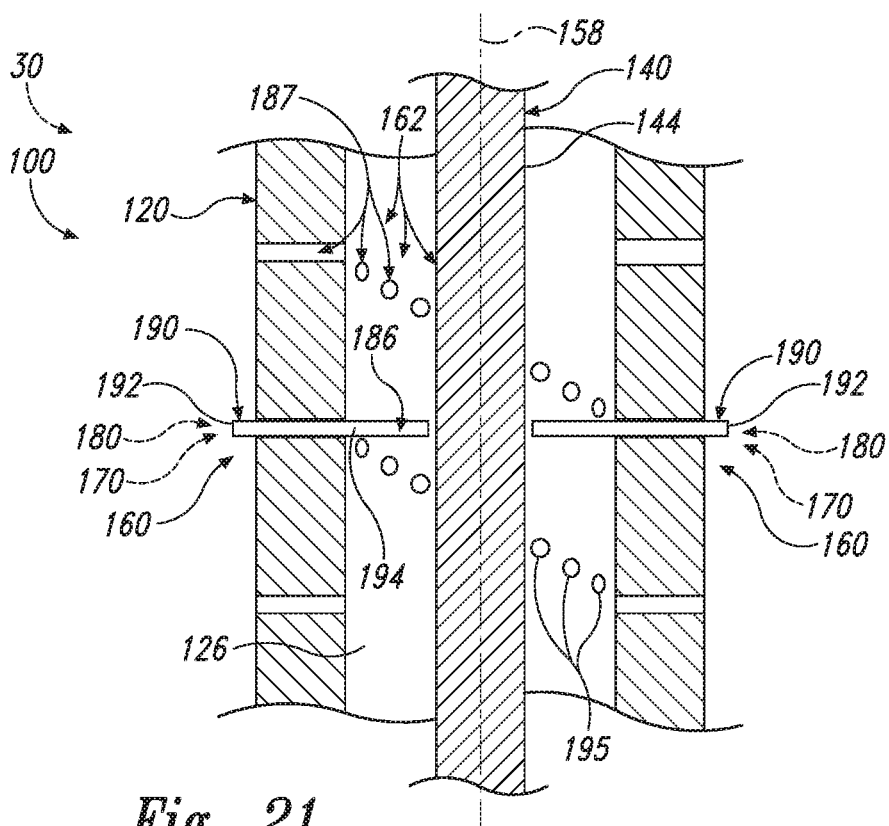
FIG. 21 is a schematic cross-sectional view of a portion of a pin tool assembly, according to the present disclosure, that includes an outer adjustment mechanism in the form of an outer pin and a plurality of outer holes.
Figure 22:
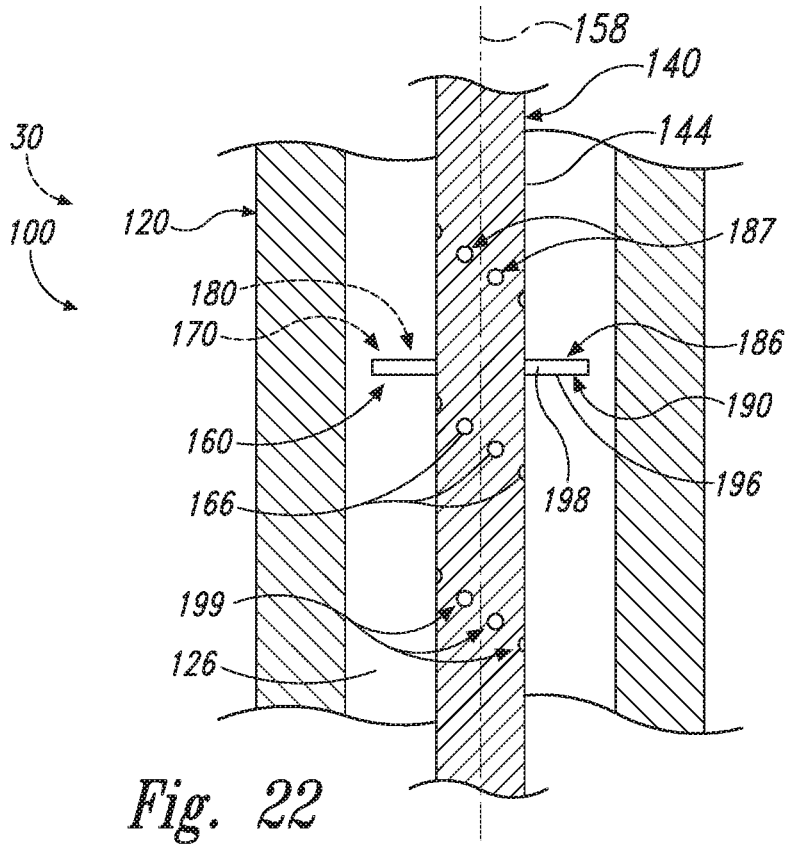
FIG. 22 is a schematic cross-sectional view of a portion of a pin tool assembly, according to the present disclosure, that includes an inner adjustment mechanism in the form of an inner pin and a plurality of inner holes.

FIGS. 21-22 illustrate adjustment mechanism 190 in the form of a pin 186 and a plurality of holes 187 configured to receive pin 186. In FIGS. 21-22 pin 186 may be configured to be selectively inserted into a selected hole 187 to change a location of adjustment mechanism 190 and thereby to change the configuration of stop 160. In addition, stop 160 may be configured to be transitioned among the plurality of stop configurations via removal of pin 186 from a given hole 187 and insertion of pin 186 into another hole 187. Thus, and when stop 160 includes pin 186 and holes 187, stop 160 may be referred to herein as defining a plurality of distinct, discrete, and/or spaced-apart stop configurations 160.

In FIG. 21, pin 186 and holes 187 define an outer adjustment mechanism 192. Under these conditions, outer stop structure 162 includes holes 187 that may be located at different locations along a length of outer member 120. As an example, and as illustrated, holes 187 may extend in a helical fashion about outer member 120 and/or along a length of outer member 120. Holes 187 also may extend perpendicular, or at least substantially perpendicular, to longitudinal axis 158. Pin 186 of outer adjustment mechanism 192 also may be referred to herein as an outer pin 194. Similarly, holes 187 of outer adjustment mechanism 192 also may be referred to herein as outer holes 195.

In FIG. 22, pin 186 and holes 187 define an inner adjustment mechanism 196. Under these conditions, inner stop structure 166 may include holes 187 that may be located at different locations along a length of inner member 140. As an example, and as illustrated, holes 187 may extend in a helical fashion about inner member 140 and/or along a length of inner member 140. Holes 187 also may extend perpendicular, or at least substantially perpendicular, to longitudinal axis 158. Pin 186 of inner adjustment mechanism 196 also may be referred to herein as an inner pin 198. Similarly, holes 187 of inner adjustment mechanism 196 also may be referred to herein as inner holes 199.

It is within the scope of the present disclosure that pin 186 may be configured for a press, or friction, fit within holes 187. Additionally or alternatively, it is also within the scope of the present disclosure that pin 186 may include and/or be a threaded pin 186, such as a set screw. Under these conditions, holes 187 may include and/or be threaded holes 187, and threaded pin 186 may be configured to be threaded into a selected one of the plurality of threaded holes 187 via rotation of threaded pin 186. When pin 186 is a set screw, outer pin 194 also may be referred to herein as an outer set screw 194 and/or inner pin 198 also may be referred to herein as an inner set screw 198. Similarly, and when holes 187 are the threaded holes, outer holes 195 also may be referred to herein as outer threaded holes 195 and/or inner holes 199 also may be referred to herein as inner threaded holes 199.

Figure 23:
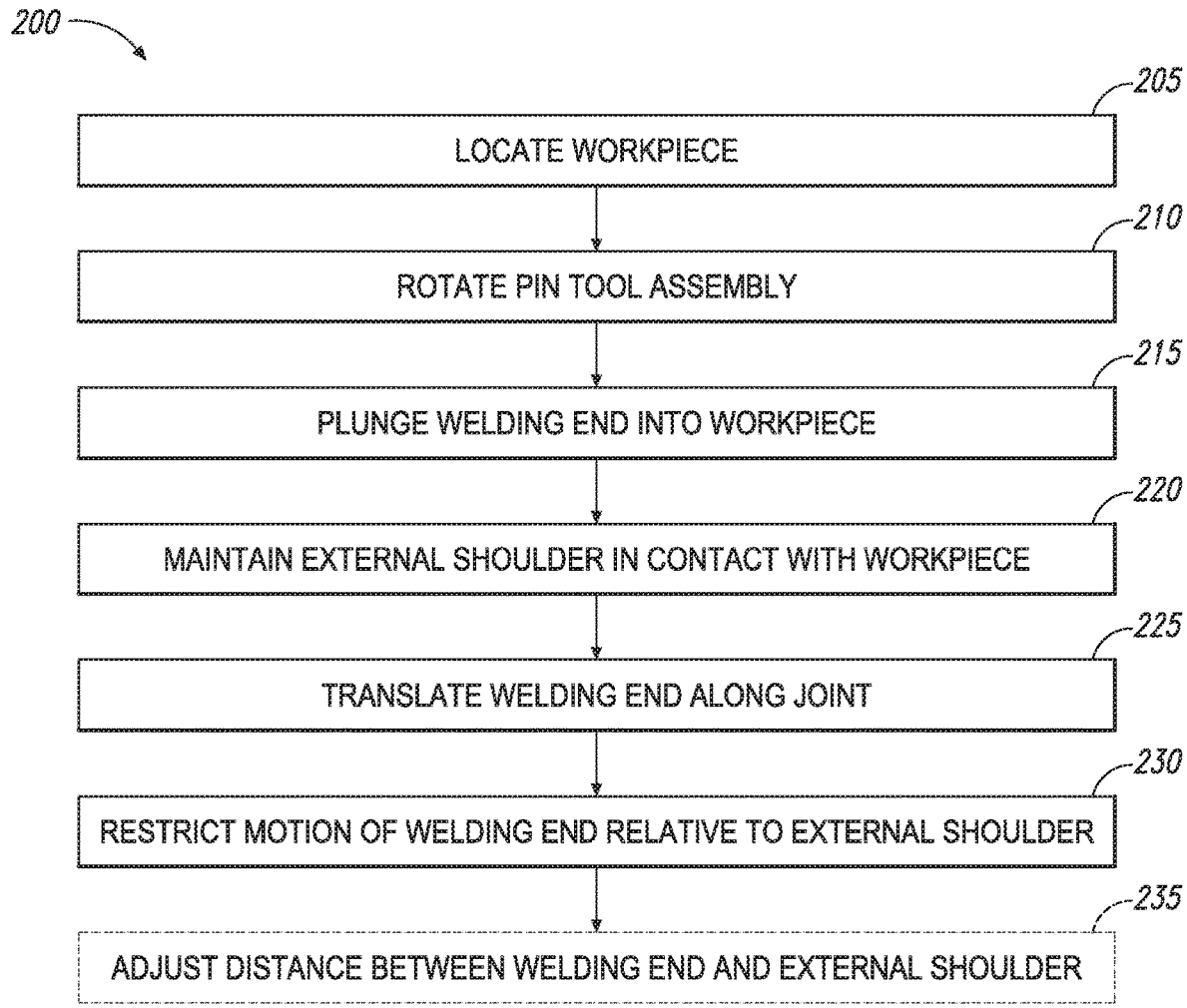
FIG. 23 is a flowchart depicting methods, according to the present disclosure, of operating a friction stir welding apparatus.

FIG. 23 is a flowchart depicting methods 200, according to the present disclosure, of operating a friction stir welding apparatus (FSWA). Methods 200 include locating a workpiece at 205, rotating a pin tool assembly at 210, and plunging a welding end of the pin tool assembly into the workpiece at 215. Methods 200 further include maintaining an external shoulder of the pin tool assembly in contact with the workpiece at 220, translating the welding end along a joint of the workpiece at 225, and restricting motion of the welding end relative to the external shoulder at 230. Methods 200 further may include adjusting a distance between the welding end and the external shoulder at 235.

Locating the workpiece at 205 may include locating the workpiece on an anvil of the FSWA. The workpiece may include two bodies that define the joint therebetween. Rotating the pin tool assembly at 210 may include rotating the pin tool assembly relative to the workpiece, rotating the pin tool assembly with a drive structure of the FSWA, rotating an outer member of the pin tool assembly, rotating an inner member of the pin tool assembly, rotating the external shoulder, and/or rotating the welding end. The inner member may define the welding end of the pin tool assembly. The outer member may define the external shoulder of the pin tool assembly. Examples of the pin tool assembly and of the drive structure are discussed herein.

Plunging the welding end of the pin tool assembly into the workpiece at 215 may include translating the welding end and the workpiece toward and/or into contact with one another. This may include operatively deforming the workpiece with the welding end, heating the workpiece via friction between the workpiece and the welding end, and/or mechanically mixing the workpiece via rotation of the welding end. The plunging at 215 may be performed utilizing a separation regulating structure, examples of which are discussed herein.

Maintaining the external shoulder of the pin tool assembly in contact with the workpiece at 220 may include maintaining the external shoulder in contact with an anvil-opposed surface of the workpiece. This may include controlling and/or regulating a normal force that is applied to the workpiece by the pin tool assembly to maintain the shoulder in contact with the workpiece. The maintaining at 220 may include maintaining during the rotating at 210, during the plunging at 215, and/or subsequent to the plunging at 215.

Translating the welding end along the joint of the workpiece at 225 may include translating to friction stir weld the two bodies together. This may include mechanically mixing, or intermixing, a portion of each of the bodies that is proximal to the joint. The translating at 225 may include translating during the rotating at 210, during the plunging at 215, and/or during the maintaining at 220.

Restricting motion of the welding end relative to the external shoulder at 230 may include restricting with a stop and/or restricting in at least one stop direction. The stop may define a plurality of stop configurations, and the restricting may include restricting within an elongate internal cavity that is defined by the outer member. The restricting at 230 may include restricting during the rotating at 210, during the plunging at 215, during the maintaining at 220, and/or during the translating at 225. Examples of the stop are disclosed herein.

Adjusting the distance between the welding end and the external shoulder at 235 may include selectively adjusting the distance. This may include adjusting to change a depth to which the welding end is plunged into the workpiece and/or adjusting based upon a thickness of the workpiece. The adjusting at 235 may include adjusting during the rotating at 210, during the plunging at 215, during the maintaining at 220, and/or during the translating at 225.

Figure 24:
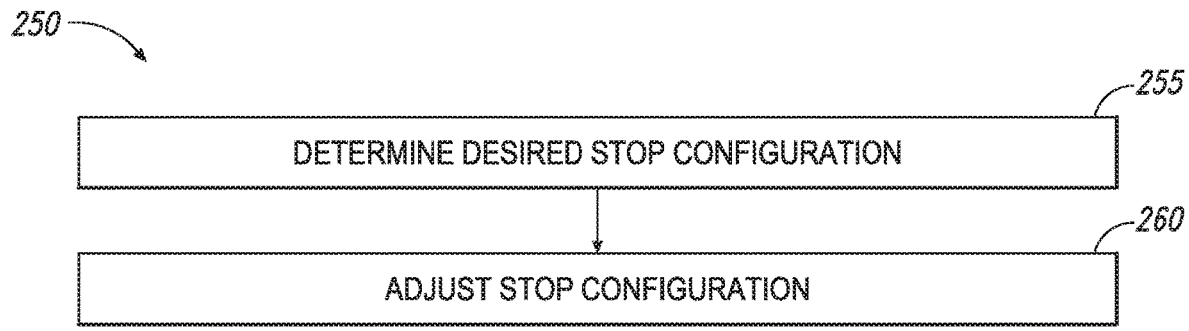
FIG. 24 is a flowchart depicting a method, according to the present disclosure, of operating a friction stir welding apparatus.

FIG. 24 is a flowchart depicting a method 250, according to the present disclosure, of operating a friction stir welding apparatus. Methods 250 include determining a desired stop configuration at 255 and adjusting a stop configuration at 260.

Determining the desired stop configuration at 255 may include determining the desired stop configuration from a plurality of different and/or distinct stop configurations for a pin tool assembly of the FSWA. The determining at 255 may be based upon any suitable criteria and/or may be accomplished in any suitable manner. As an example, the determining at 255 may be based, at least in part, on a thickness of a workpiece that is to be friction stir welded by the FSWA.

Adjusting the stop configuration at 260 may include adjusting the stop configuration of the pin tool assembly by changing a location of an adjustment mechanism of the pin tool assembly. The pin tool assembly may include an outer member, which defines an elongate internal cavity and an external shoulder, and an inner member, which extends at least partially within the elongate internal cavity and defines a welding end. The welding end may project from the elongate internal cavity via an opening that is defined within the external shoulder, and the desired stop configuration may correspond to a desired distance between the welding end and the external shoulder.

Changing the location of the adjustment mechanism may include modifying a relative orientation at which the inner member and the outer member operatively couple with one another within the elongate internal cavity via the adjustment mechanism. As an example, the changing the location may include rotating a threaded busing of the pin tool assembly. As another example, the changing the location may include locating a set screw of the pin tool assembly within a selected one of a plurality of threaded holes of the pin tool assembly.

Illustrative, non-exclusive examples of inventive subject matter according to the present disclosure are described in the following enumerated paragraphs:

A1. A pin tool assembly for a friction stir welding apparatus, the assembly comprising:

optionally, an outer member including an inner surface that defines an elongate internal cavity, wherein the outer member further includes an external shoulder, and further wherein the external shoulder includes an opening to the elongate internal cavity;

an inner member that includes a welding end, wherein the inner member extends at least partially within the elongate internal cavity and projects from the opening such that the welding end is external the elongate internal cavity, and further wherein the pin tool assembly is configured to permit motion of the inner member relative to the outer member to vary a distance between the welding end and the external shoulder; and a stop that defines a plurality of stop configurations, wherein each of the plurality of stop configurations restricts, within the elongate internal cavity, the motion of the inner member relative to the outer member in a stop direction and defines a corresponding stop distance between the welding end and the external shoulder.

A2. The assembly of paragraph A1, wherein the stop is an adjustable stop.

A3. The assembly of any of paragraphs A1-A2, wherein the plurality of stop configurations includes a plurality of discrete stop configurations that includes at least 2, at least 3, at least 4, at least 5, at least 6, at least 8, at least 10, at least 12, at least 14, at least 16, at least 18, or at least 20 discrete stop configurations that define a corresponding plurality of different stop distances.

A4. The assembly of any of paragraphs A1-A3, wherein the plurality of stop configurations includes an infinite number of different stop configurations that define an infinite number of different stop distances.

A5. The assembly of any of paragraphs A1-A4, wherein, when the stop is restricting the motion of the inner member relative to the outer member, the plurality of stop configurations includes a maximum extension configuration, in which the distance between the welding end and the external shoulder has a maximum value, and a minimum extension configuration, in which the distance between the welding end and the external shoulder has a minimum value, and further wherein a remainder of the plurality of stop configurations is between the maximum extension configuration and the minimum extension configuration.

A5.1 The assembly of paragraph A5, wherein a difference between the maximum value and the minimum value is at least one of at least 0.25 millimeter (mm), at least 0.5 mm, at least 0.75 mm, at least 1 mm, at least 2 mm, at least 3 mm, at least 4 mm, at least 5 mm, at least 7.5 mm, or at least 10 mm.

A5.2 The assembly of any of paragraphs A5-A5.1, wherein a/the difference between the maximum value and the minimum value is at least one of less than 20 millimeters (mm), less than 15 mm, less than 10 mm, less than 8 mm, less than 6 mm, less than 5 mm, less than 4 mm, less than 3 mm, less than 2 mm, or less than 1 mm.

A6. The assembly of any of paragraphs A1-A5.2, wherein the stop includes a retraction stop.

A6.1 The assembly of paragraph A6, wherein the retraction stop is configured to limit retraction of the inner member into the elongate internal cavity and thereby to define a corresponding minimum distance between the welding end and the external shoulder.

A6.2 The assembly of any of paragraphs A6-A6.1, wherein the stop direction is a retraction direction.

A7. The assembly of any of paragraphs A1-A6, wherein the stop includes an extension stop.

A7.1 The assembly of paragraph A7, wherein the extension stop is configured to limit extension of the inner member from the opening and thereby to define a corresponding maximum distance between the welding end and the external shoulder.

A7.2 The assembly of any of paragraphs A7-A7.1, wherein the stop direction is an extension direction.

A8. The assembly of any of paragraphs A1-A7.2, wherein the stop is an/the extension stop, and further wherein the pin tool assembly includes a/the retraction stop.

A9. The assembly of any of paragraphs A1-A8, wherein the stop includes:

(i) an outer stop structure that is defined by the outer member, and optionally by a portion of the outer member that defines a portion of the elongate internal cavity; and (ii) an inner stop structure that is defined by the inner member, and optionally by a portion of the inner member that extends within the elongate internal cavity.

A9.1 The assembly of paragraph A9, wherein the inner member defines an inner flange that extends radially from an external surface of the inner member, and further wherein the inner stop structure includes the inner flange.

A9.1.1 The assembly of paragraph A9.1, wherein the inner flange is integral to the inner member.

A9.1.2 The assembly of any of paragraphs A9.1-A9.1.1, wherein the inner flange extends perpendicular to a longitudinal axis of the inner member.

A9.1.3 The assembly of any of paragraphs A9.1-A9.1.2, wherein the inner flange defines a welding end-proximal surface that faces toward the welding end.

A9.1.3.1 The assembly of paragraph A9.1.3, wherein the welding end-proximal surface extends perpendicular to a/the longitudinal axis of the inner member.

A9.1.3.2 The assembly of any of paragraphs A9.1.3-A9.1.3.1, wherein the inner flange extends from the welding end-proximal surface to a drive end of the inner member that is opposed to the welding end.

A9.1.4 The assembly of any of paragraphs A9.1-A9.1.3, wherein the inner flange defines a welding end-distal surface that faces away from the welding end.

A9.1.4.1 The assembly of paragraph A9.1.4, wherein the welding end-distal surface extends perpendicular to a/the longitudinal axis of the inner member.

A9.1.4.2 The assembly of any of paragraphs A9.1.4-A9.1.4.1, wherein the inner flange extends from the welding end-distal surface to the welding end.

A9.1.4.3 The assembly of any of paragraphs A9.1.4-A9.1.4.2, wherein the inner flange extends between the welding end-distal surface and a/the welding end-proximal surface of the inner flange.

A9.1.5 The assembly of any of paragraphs A9.1-A9.1.4.3, wherein the stop further includes an outer adjustment mechanism that is operatively attached to the outer member.

A9.1.5.1 The assembly of paragraph A9.1.5, wherein the stop is a/the retraction stop, and further wherein the outer adjustment mechanism is configured to operatively contact a/the welding end-distal surface of the inner flange to restrict motion of the inner member within the elongate internal cavity in a/the retraction direction.

A9.1.5.2 The assembly of any of paragraphs A9.1.5-A9.1.5.1, wherein the stop is a/the retraction stop, and further wherein the outer adjustment mechanism is located between a/the welding end-distal surface of the inner flange and a/the drive end of the inner member that is opposed to the welding end of the inner flange.

A9.1.5.3 The assembly of any of paragraphs A9.1.5-A9.1.5.2, wherein the stop is a/the extension stop, and further wherein the outer adjustment mechanism is configured to operatively contact a/the welding end-proximal surface of the inner flange to restrict motion of the inner member within the elongate internal cavity in a/the extension direction.

A9.1.5.4 The assembly of any of paragraphs A9.1.5-A9.1.5.3, wherein the stop is a/the extension stop, and further wherein the outer adjustment mechanism is located between a/the welding end-proximal surface of the inner flange and the welding end of the inner member.

A9.1.5.5 The assembly of any of paragraphs A9.1.5-A9.1.5.4, wherein the outer adjustment mechanism includes an outer threaded bushing, wherein the outer stop structure includes an outer threaded region that extends along the inner surface of the outer member, and further wherein the outer threaded bushing is configured to be threaded into the outer threaded region via rotation of the outer threaded bushing relative to the outer member.

A9.1.5.5.1 The assembly of paragraph A9.1.5.5, wherein the threaded region extends along a longitudinal axis of the elongate internal cavity.

A9.1.5.5.2 The assembly of any of paragraphs A9.1.5-A9.1.5.5.1, wherein the stop is configured to be transitioned among the plurality of stop configurations via rotation of the outer threaded bushing relative to the outer member.

A9.1.5.5.3 The assembly of any of paragraphs A9.1.5-A9.1.5.5.2, wherein the stop further includes an outer locking structure configured to lock the outer threaded bushing at a desired location within the outer threaded region, optionally wherein the outer locking structure includes an inner lock nut.

A9.1.5.6 The assembly of any of paragraphs A9.1.5-A9.1.5.5.3, wherein the outer adjustment mechanism includes an outer pin, wherein the outer stop structure includes a plurality of outer holes that is configured to receive the outer pin, and further wherein the outer pin is configured to be inserted into a selected one of the plurality of outer holes.

A9.1.5.6.1 The assembly of paragraph A9.1.5.6, wherein the outer pin is an outer set screw, wherein the plurality of outer holes is a plurality of outer threaded holes, and further wherein the outer set screw is configured to be threaded into a selected one of the plurality of outer threaded holes via rotation of the outer set screw relative to the outer member.

A9.1.5.6.2 The assembly of any of paragraphs A9.1.5.6-A9.1.5.6.1, wherein the plurality of outer holes extends perpendicular, or at least substantially perpendicular, to a/the longitudinal axis of the elongate internal cavity.

A9.1.5.6.3 The assembly of any of paragraphs A9.1.5.6-A9.1.5.6.2, wherein the stop is configured to be transitioned among the plurality of stop configurations via removal of the outer pin from a given outer hole of the plurality of outer holes and installation of the outer pin within another outer hole of the plurality of outer holes.

A9.1.5.6.4 The assembly of any of paragraphs A9.1.5.6-A9.1.5.6.3, wherein the plurality of outer holes extends helically along a length of the outer member.

A9.2 The assembly of any of paragraphs A9-A9.1.5.6.4, wherein the outer member defines an outer flange that extends radially inward from the inner surface of the outer member, and further wherein the outer stop structure includes the outer flange.

A9.2.1 The assembly of paragraph A9.2, wherein the outer flange is integral to the outer member.

A9.2.2 The assembly of any of paragraphs A9.2-A9.2.1, wherein the outer flange extends perpendicular to a longitudinal axis of the outer member.

A9.2.3 The assembly of any of paragraphs A9.2-A9.2.2, wherein the outer flange defines a shoulder-opposed surface.

A9.2.3.1 The assembly of paragraph A9.2.3, wherein the shoulder-opposed surface extends perpendicular to a/the longitudinal axis of the outer member.

A9.2.3.2 The assembly of any of paragraphs A9.2.3-A9.2.3.1, wherein the outer flange extends from the shoulder-opposed surface to the external shoulder.

A9.2.4 The assembly of any of paragraphs A9.2-A9.2.3.2, wherein the outer flange defines a shoulder-facing surface.

A9.2.4.1 The assembly of paragraph A9.2.4, wherein the shoulder-facing surface extends perpendicular to a/the longitudinal axis of the outer member.

A9.2.4.2 The assembly of any of paragraphs A9.2.4-A9.2.4.1, wherein the outer flange extends from the shoulder-facing surface to a drive end of the outer member that is opposed to the external shoulder.

A9.2.4.3 The assembly of any of paragraphs A9.2.4-A9.2.4.2, wherein the outer flange extends between the shoulder-facing surface and a/the shoulder-opposed surface of the outer flange.

A9.2.5 The assembly of any of paragraphs A9.2-A9.2.4.3, wherein the stop further includes an inner adjustment mechanism that is operatively attached to the inner member.

A9.2.5.1 The assembly of paragraph A9.2.5, wherein the stop is a/the retraction stop, and further wherein the inner adjustment mechanism is configured to operatively contact a/the shoulder-facing surface of the outer flange to restrict motion of the inner member within the elongate internal cavity in a/the retraction direction.

A9.2.5.2 The assembly of any of paragraphs A9.2.5-A9.2.5.1, wherein the stop is a/the retraction stop, and further wherein the inner adjustment mechanism is located between a/the shoulder-facing surface of the outer flange and the external shoulder.

A9.2.5.3 The assembly of any of paragraphs A9.2.5-A9.2.5.2, wherein the stop is a/the extension stop, and further wherein the inner adjustment mechanism is configured to operatively contact a/the shoulder-opposed surface of the outer flange to restrict motion of the inner member within the elongate internal cavity in a/the extension direction.

A9.2.5.4 The assembly of any of paragraphs A9.2.5-A9.2.5.3, wherein the stop is a/the extension stop, and further wherein the inner adjustment mechanism is located between a/the shoulder-opposed surface of the outer flange and a/the drive end of the outer member that is opposed to the external shoulder.

A9.2.5.5 The assembly of any of paragraphs A9.2.5-A9.2.5.4, wherein the inner adjustment mechanism includes an inner threaded bushing, wherein the inner stop structure includes an inner threaded region that extends along the external surface of the inner member, and further wherein the inner threaded bushing is configured to be threaded into the inner threaded region via rotation of the inner threaded bushing.

A9.2.5.5.1 The assembly of paragraph A9.2.5.5, wherein the inner threaded region extends along a longitudinal axis of the elongate internal cavity.

A9.2.5.5.2 The assembly of any of paragraphs A9.2.5.5-A9.2.5.5.1, wherein the stop is configured to be transitioned among the plurality of stop configurations via rotation of the inner threaded bushing.

A9.2.5.5.3 The assembly of any of paragraphs A9.2.5.5-A9.2.5.5.2, wherein the stop further includes an inner locking structure configured to lock the inner threaded bushing at a desired location within the inner threaded region, optionally wherein the inner locking structure includes an inner lock nut.

A9.2.5.6 The assembly of any of paragraphs A9.2.5-A9.2.5.5.3, wherein the inner adjustment mechanism includes an inner pin, wherein the inner stop structure includes a plurality of inner holes that is configured to receive the inner pin, and further wherein the inner pin is configured to be inserted into a selected one of the plurality of inner holes.

A9.2.5.6.1 The assembly of paragraph A9.2.5.6, wherein the inner pin is an inner set screw, wherein the plurality of inner holes is a plurality of inner threaded holes, and further wherein the inner set screw is configured to be threaded into a selected one of the plurality of inner threaded holes via rotation of the inner set screw relative to the inner member.

A9.2.5.6.2 The assembly of any of paragraphs A9.2.5.6-A9.2.5.6.1, wherein the plurality of inner holes extends perpendicular, or at least substantially perpendicular to a/the longitudinal axis of the elongate internal cavity.

A9.2.5.6.3 The assembly of any of paragraphs A9.2.5.6-A9.2.5.6.2, wherein the stop is configured to be transitioned among the plurality of stop configurations via removal of the inner pin from a given inner hole of the plurality of inner holes and installation of the inner pin within another inner hole of the plurality of inner holes.

A9.2.5.6.4 The assembly of any of paragraphs A9.2.5.6-A9.2.5.6.3, wherein the plurality of inner holes extends helically along a length of the inner member.

A10. The assembly of any of paragraphs A1-A9.2.5.6.4, wherein the stop is a/the adjustable stop, wherein the stop direction is a first stop direction, and further wherein the pin tool assembly includes a fixed stop configured to restrict motion of the inner member relative to the outer member in a second stop direction that is opposed to the first stop direction, optionally wherein the first stop direction is one of an/the extension direction and and/the retraction direction, and further optionally wherein the second stop direction is the other of the extension direction and the retraction direction.

A11. The assembly of any of paragraphs A1-A10, wherein the welding end is a planar welding end.

A12. The assembly of any of paragraphs A1-A11, wherein the welding end is a smooth welding end.

A13. The assembly of any of paragraphs A1-A12, wherein the welding end is a grooved welding end.

A14. The assembly of any of paragraphs A1-A13, wherein the inner member has a cylindrical, or at least substantially cylindrical, external surface.

A15. The assembly of any of paragraphs A1-A14, wherein a portion of the inner member that projects from the opening is perpendicular, or at least substantially perpendicular, to the external shoulder.

A16. The assembly of any of paragraphs A1-A15, wherein the external shoulder is a planar external shoulder.

A17. The assembly of any of paragraphs A1-A16, wherein the external shoulder is a smooth external shoulder.

A18. The assembly of any of paragraphs A1-A17, wherein the external shoulder is a grooved external shoulder.

A19. The assembly of any of paragraphs A1-A18, wherein the elongate internal cavity is a cylindrical, or at least substantially cylindrical, elongate internal cavity.

A20. The assembly of any of paragraphs A1-A19, wherein an external surface of the outer member is a cylindrical, or at least substantially cylindrical, external surface.

A21. The assembly of any of paragraphs A1-A20, wherein the outer member is a tubular, or at least substantially tubular, outer member.

A22. The assembly of any of paragraphs A1-A21, wherein the outer member is a hollow cylindrical, or at least substantially hollow cylindrical, outer member.

B1. A friction stir welding apparatus comprising:
the pin tool assembly of any of paragraphs A1-A22;
a drive structure configured to rotate the pin tool assembly about a/the longitudinal axis of the inner member;

an inner member translation structure configured to selectively vary the distance between the welding end of the inner member and the external shoulder of the outer member;

an anvil that defines an anvil surface that is opposed to the welding end of the inner member; and a separation regulating structure that is configured to selectively vary a distance between the external shoulder of the outer member and the anvil surface.

B2. The friction stir welding apparatus of paragraph B1, wherein the apparatus further includes a control structure configured to automatically control the operation of at least one of:

(i) the drive structure;
(ii) the inner member translation structure; and
(iii) the separation regulating structure.

C1. A method of operating a friction stir welding apparatus (FSWA), the method comprising:

locating a workpiece on an anvil of the FSWA, wherein the workpiece includes a joint between two bodies to be friction stir welded together;

rotating a pin tool assembly of the FSWA;

plunging a welding end of an inner member of the pin tool assembly into the workpiece;

maintaining an external shoulder of an outer member of the pin tool assembly in contact with an anvil-opposed surface of the workpiece, wherein the outer member defines an elongate internal cavity, and further wherein the inner member extends through the elongate internal cavity;

translating the welding end of the pin tool assembly along the joint to friction stir weld the two bodies together; and during the translating, restricting motion of the welding end relative to the external shoulder in a stop direction with a stop, wherein the stop defines a plurality of stop configurations, and further wherein the restricting includes restricting within the elongate internal cavity.

C2. The method of paragraph C1, wherein the method further includes adjusting a distance between the welding end and the external shoulder during the translating.

D1. A method of operating a friction stir welding apparatus (FSWA), the method comprising:

determining a desired stop configuration of a plurality of stop configurations for a pin tool assembly of the FSWA; and adjusting a stop configuration of the pin tool assembly to the desired stop configuration by changing a location of an adjustment mechanism of the pin tool assembly, wherein the pin tool assembly includes an outer member, which defines an elongate internal cavity and an external shoulder, and an inner member, which extends at least partially within the elongate internal cavity and defines a welding end that projects from the elongate internal cavity via an opening that is defined within the external shoulder, wherein the desired stop configuration corresponds to a desired distance between the welding end and the external shoulder, and further wherein the changing includes modifying a relative orientation at which the inner member, within the elongate internal cavity, operatively couples to the outer member via the adjustment mechanism.

D2. The method of paragraph D1, wherein the determining is based, at least in part, on a thickness of a workpiece that is to be friction stir welded by the FSWA.

D3. The method of any of paragraphs D1-D2, wherein the adjusting includes rotating a threaded bushing of the pin tool assembly.

D4. The method of any of paragraphs D1-D3, wherein the adjusting includes locating a set screw of the pin tool assembly within a selected one of a plurality of threaded holes of the pin tool assembly.

E1. The method of any of paragraphs C1-D4, wherein the pin tool assembly includes the pin tool assembly of any of paragraphs A1-A22.

E2. The method of any of paragraphs C1-E1, wherein the friction stir welding apparatus includes the friction stir welding apparatus of any of paragraphs B1-62.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of operating a friction stir welding apparatus (FSWA), the method comprising:

locating a workpiece on an anvil of the FSWA, wherein the workpiece includes a joint between two bodies to be friction stir welded together;

rotating a pin tool assembly of the FSWA;

plunging a welding end of an inner member of the pin tool assembly into the workpiece;

maintaining an external shoulder of an outer member of the pin tool assembly in contact with an anvil-opposed surface of the workpiece, wherein the outer member defines an elongate internal cavity, and further wherein the inner member extends through the elongate internal cavity;

translating the welding end of the pin tool assembly along the joint to friction stir weld the two bodies together; and during the translating, restricting motion of the welding end relative to the external shoulder in a stop direction with a stop of an adjustment mechanism that extends at least partially within the elongate internal cavity, wherein the stop defines a plurality of stop configurations, and further wherein the restricting includes restricting within the elongate internal cavity.

2. The method of claim 1, wherein the rotating the pin tool assembly includes at least one of:
(i) rotating the pin tool assembly relative to the workpiece;
(ii) rotating the pin tool assembly with a drive structure of the FSWA;
(iii) rotating the outer member of the pin tool assembly;
(iv) rotating the inner member of the pin tool assembly;
(v) rotating the external shoulder; and
(vi) rotating the welding end.

3. The method of claim 1, wherein the plunging includes translating the welding end and the workpiece into contact with one another.

4. The method of claim 1, wherein the plunging includes at least one of:
(i) operatively deforming the workpiece with the welding end;
(ii) heating the workpiece via friction between the workpiece and the welding end; and
(iii) mechanically mixing the workpiece via rotation of the welding end.

5. The method of claim 1, wherein the plunging includes utilizing a separation regulating structure to selectively vary a distance between the external shoulder of the outer member and the anvil.

6. The method of claim 1, wherein the maintaining includes regulating a normal force that is applied to the workpiece by the pin tool assembly to maintain the external shoulder in contact with the workpiece.

7. The method of claim 1, wherein the maintaining includes maintaining during the rotating and subsequent to the plunging.

8. The method of claim 1, wherein the translating includes mechanically intermixing a portion of each of the two bodies that is proximal to the joint.

9. The method of claim 1, wherein the translating includes translating during the rotating and during the maintaining.

10. The method of claim 1, wherein the restricting includes restricting during the translating.

11. The method of claim 1, wherein the method further includes adjusting a distance between the welding end and the external shoulder during the translating.

12. The method of claim 11, wherein the adjusting includes selectively adjusting the distance between the welding end and the external shoulder to change a depth to which the welding end plunges into the workpiece.

13. The method of claim 11, wherein the adjusting includes selectively adjusting the distance between the welding end and the external shoulder based, at least in part, on a thickness of the workpiece.

14. The method of claim 11, wherein the adjusting includes adjusting during the translating.

15. The method of claim 1, wherein the stop extends at least partially within the elongate internal cavity.

16. A method of operating a friction stir welding apparatus (FSWA), the method comprising:

determining a desired stop configuration of a plurality of stop configurations for a pin tool assembly of the FSWA; and adjusting a stop configuration of the pin tool assembly to the desired stop configuration by changing a location of an adjustment mechanism of the pin tool assembly, wherein the pin tool assembly includes an outer member, which defines an elongate internal cavity and an external shoulder, and an inner member, which extends at least partially within the elongate internal cavity and defines a welding end that projects from the elongate internal cavity via an opening that is defined within the external shoulder, wherein the desired stop configuration corresponds to a desired distance between the welding end and the external shoulder, and further wherein the changing includes modifying a relative orientation at which the inner member, within the elongate internal cavity, operatively couples to the outer member via the adjustment mechanism.

17. The method of claim 16, wherein the determining is based, at least in part, on a thickness of a workpiece that is to be friction stir welded by the FSWA.

18. The method of claim 16, wherein the adjusting includes rotating a threaded bushing of the pin tool assembly.

19. The method of claim 16, wherein the adjusting includes locating a set screw of the pin tool assembly within a selected one of a plurality of threaded holes of the pin tool assembly.

20. The method of claim 16, wherein the adjustment mechanism extends at least partially within the elongate internal cavity.

* * * * *